United States Patent
Hamada et al.

(10) Patent No.: US 11,893,694 B2
(45) Date of Patent: Feb. 6, 2024

(54) REPRODUCTION APPARATUS, ANALYSIS ASSISTANCE SYSTEM, AND REPRODUCTION METHOD FOR SYNCHRONIZING REPRODUCTION OF A CONSTRUCTION MACHINE MODEL

(71) Applicant: KOMATSU LTD., Tokyo (JP)

(72) Inventors: Shintaro Hamada, Tokyo (JP); Yoshiyuki Onishi, Tokyo (JP); Mitsuhiro Aoki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 98 days.

(21) Appl. No.: 17/434,640

(22) PCT Filed: Apr. 14, 2020

(86) PCT No.: PCT/JP2020/016412
§ 371 (c)(1),
(2) Date: Aug. 27, 2021

(87) PCT Pub. No.: WO2020/218087
PCT Pub. Date: Oct. 29, 2020

(65) Prior Publication Data
US 2022/0172434 A1    Jun. 2, 2022

(30) Foreign Application Priority Data
Apr. 26, 2019  (JP) ................ 2019-086576

(51) Int. Cl.
*G06T 19/00*      (2011.01)
*E02F 9/26*       (2006.01)
*G06T 13/20*      (2011.01)
*G07C 3/02*       (2006.01)

(52) U.S. Cl.
CPC ............. *G06T 19/00* (2013.01); *E02F 9/26* (2013.01); *G06T 13/20* (2013.01); *G07C 3/02* (2013.01)

(58) Field of Classification Search
CPC .................................................... G06T 13/20
See application file for complete search history.

(56) References Cited

U.S. PATENT DOCUMENTS

| | | | |
|---|---|---|---|
| 2007/0282577 A1 | 12/2007 | Lind | |
| 2019/0048560 A1* | 2/2019 | Misaki | E02F 9/261 |
| 2020/0173791 A1* | 6/2020 | Misaki | G06Q 10/06 |
| 2021/0246626 A1* | 8/2021 | Yamamoto | G08B 21/24 |

FOREIGN PATENT DOCUMENTS

| | | |
|---|---|---|
| CN | 107882103 A | 4/2018 |
| JP | A-2001-090120 | 4/2001 |
| JP | A-2004-162846 | 6/2004 |
| JP | A-2016-045674 | 4/2016 |
| JP | A-2016-089388 | 5/2016 |
| KR | 20130044396 A | 5/2013 |

* cited by examiner

*Primary Examiner* — Ryan McCulley
(74) *Attorney, Agent, or Firm* — Fish & Richardson P.C.

(57) ABSTRACT

A control apparatus for work machines includes a position designation reception unit configured to identify designation of a position with respect to a state image displayed on a display panel and a screen control unit configured to perform screen control according to an image displayed at the position that has been identified, among partial images constituting parts of the state image.

15 Claims, 13 Drawing Sheets

FIG. 3
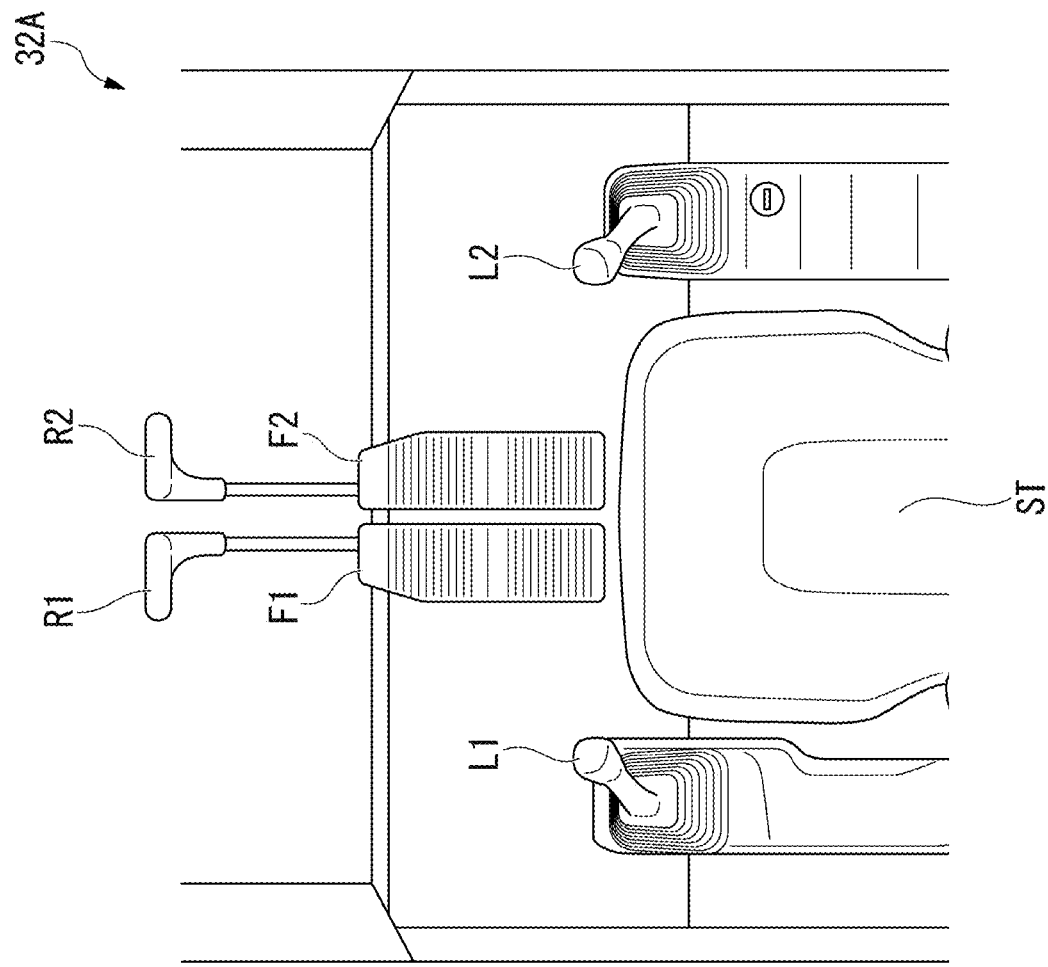
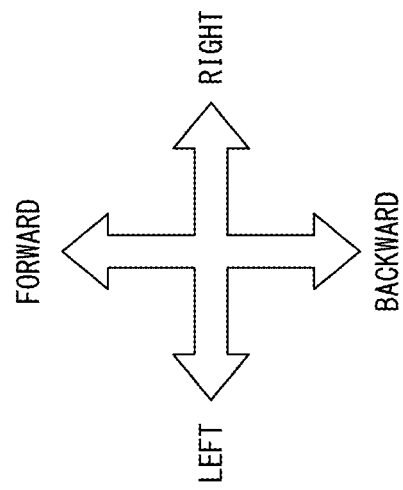

FIG. 6

<LOG INFORMATION>

| CONSTRUCTION MACHINE IDENTIFICATION INFORMATION = ○○○○○○ | | | | | | | |
|---|---|---|---|---|---|---|---|
| TIME POINT | POSITION | ROLL ANGLE | PITCH ANGLE | SWING ANGLE | BOOM ANGLE | ARM ANGLE | BUCKET ANGLE |
| // ::aa | X, Y, Z | a | e | i | m | q | **u |
| // ::bb | X, Y, Z | b | f | j | n | r | **v |
| // ::cc | X, Y, Z | c | g | k | o | s | **w |
| // ::dd | X, Y, Z | d | h | l | p | t | **x |
| ... | ... | ... | ... | ... | ... | ... | ... |

FIG. 7

<LOG INFORMATION>

TL

| TIME POINT | CONSTRUCTION MACHINE IDENTIFICATION INFORMATION=○○○○○○ ||||||||||||
|---|---|---|---|---|---|---|---|---|---|---|---|---|
| | PPC PRESSURE ||||||||||||
| | RIGHT SWING | LEFT SWING | FLEXION OF ARM | EXTENSION OF ARM | RAISING OF BOOM | LOWERING OF BOOM | EXCAVATION OF BUCKET | OPENING OF BUCKET | FORWARD MOVEMENT OF RIGHT TRACK | BACKWARD MOVEMENT OF RIGHT TRACK | FORWARD MOVEMENT OF LEFT TRACK | BACKWARD MOVEMENT OF LEFT TRACK |
| \*\*/\*\*/\*\* \*\*:\*\*:aa | \*\*aa | \*\*ee | \*\*ii | \*\*mm | \*\*qq | \*\*uu | \*\*aaa | \*\*eee | \*\*iii | \*\*mmm | \*\*aaa | \*\*eee |
| \*\*/\*\*/\*\* \*\*:\*\*:bb | \*\*bb | \*\*ff | \*\*jj | \*\*nn | \*\*rr | \*\*vv | \*\*bbb | \*\*fff | \*\*jjj | \*\*nnn | \*\*bbb | \*\*fff |
| \*\*/\*\*/\*\* \*\*:\*\*:cc | \*\*cc | \*\*gg | \*\*kk | \*\*oo | \*\*ss | \*\*ww | \*\*ccc | \*\*ggg | \*\*kkk | \*\*ooo | \*\*ccc | \*\*ggg |
| \*\*/\*\*/\*\* \*\*:\*\*:dd | \*\*dd | \*\*hh | \*\*ll | \*\*pp | \*\*tt | \*\*xx | \*\*ddd | \*\*hhh | \*\*lll | \*\*ppp | \*\*ddd | \*\*hhh |
| ... | ... | ... | ... | ... | ... | ... | ... | ... | ... | ... | ... | ... |

FIG. 8

<LOG INFORMATION>

| | CONSTRUCTION MACHINE IDENTIFICATION INFORMATION=○○○○○○ | | | | | |
|---|---|---|---|---|---|---|
| TIME POINT | ENGINE COOLING WATER TEMPERATURE | ENGINE OUTPUT | INSTANTANEOUS FUEL CONSUMPTION | OIL TEMPERATURE | DRIVING MODE | TRANSPORT VEHICLE ID |
| \*\*/\*\*/\*\* \*\*:\*\*:aa | \*\*\*\*\*A | \*\*\*\*\*E | \*\*\*\*\*I | \*\*\*\*\*M | HORSEPOWER PRIORITY | DUMP_ID_1 |
| \*\*/\*\*/\*\* \*\*:\*\*:bb | \*\*\*\*\*B | \*\*\*\*\*F | \*\*\*\*\*J | \*\*\*\*\*N | HORSEPOWER PRIORITY | DUMP_ID_1 |
| \*\*/\*\*/\*\* \*\*:\*\*:cc | \*\*\*\*\*C | \*\*\*\*\*G | \*\*\*\*\*K | \*\*\*\*\*O | HORSEPOWER PRIORITY | DUMP_ID_1 |
| \*\*/\*\*/\*\* \*\*:\*\*:dd | \*\*\*\*\*D | \*\*\*\*\*H | \*\*\*\*\*L | \*\*\*\*\*P | HORSEPOWER PRIORITY | DUMP_ID_1 |
| ⋮ | ⋮ | ⋮ | ⋮ | ⋮ | ⋮ | ⋮ |

TL

REPRODUCTION APPARATUS, ANALYSIS ASSISTANCE SYSTEM, AND REPRODUCTION METHOD FOR SYNCHRONIZING REPRODUCTION OF A CONSTRUCTION MACHINE MODEL

CROSS-REFERENCE TO RELATED APPLICATIONS

This application is a National Stage application under 35 U.S.C. § 371 of International Application No. PCT/JP2020/016412, filed on Apr. 14, 2020, which claims priority to Japanese Patent Application No. 2019-086576, filed on Apr. 26, 2019. The contents of the prior applications are incorporated herein in their entirety.

TECHNICAL FIELD

The present invention relates to a reproduction apparatus, an analysis assistance system, and a reproduction method.

BACKGROUND ART

In Patent Literature 1, a work assistance image generation apparatus and a remote control system for a construction machine including the work assistance image generation apparatus capable of assisting an operator in performing work and generating an assistance image including information about a relative position between a construction machine and a transport vehicle without a vehicle equipped with a dedicated camera being disposed on site are disclosed.

CITATION LIST

Patent Literature

Patent Literature 1
Japanese Unexamined Patent Application, First Publication No. 2016-089388

SUMMARY OF INVENTION

Technical Problem

In fields associated with driving and operations of construction machines, there is a need for looking back on one's own operations, knowing the movement of a skilled operator, knowing the movement of a construction machine when the construction machine fails or is abnormal, and the like. Therefore, the development of a tool capable of analyzing the movement of a construction machine in detail by faithfully reproducing the movement of the construction machine based on an operation of an operator is required.

The above tool is required to have a function of enabling a movement difference between two different construction machines to be ascertained.

In view of the above-described problems, an objective of the present invention is to provide a reproduction apparatus, an analysis assistance system, and a reproduction method having a function of enabling a movement difference between two different construction machines to be ascertained.

Solution to Problem

According to an aspect of the present invention, there is provided a reproduction apparatus including: an acquisition unit configured to acquire log information of a construction machine; a reproduction unit configured to reproduce an operation of the construction machine by sequentially applying angle information of the construction machine included in the log information to a construction machine model; and a synchronization unit configured to synchronize reproduction of the construction machine model based on first log information which is the log information and reproduction of the construction machine model based on second log information which is the log information.

Advantageous Effects of Invention

According to the above aspect, it is possible to ascertain a movement difference between two different construction machines.

BRIEF DESCRIPTION OF DRAWINGS

FIG. 3 is a diagram showing a configuration of a cab of the construction machine according to the first embodiment.
FIG. 6 is a first diagram showing an example of log information according to the first embodiment.
FIG. 7 is a second diagram showing an example of log information according to the first embodiment.
FIG. 8 is a third diagram showing an example of log information according to the first embodiment.

DESCRIPTION OF EMBODIMENTS

First Embodiment

Figure 1:
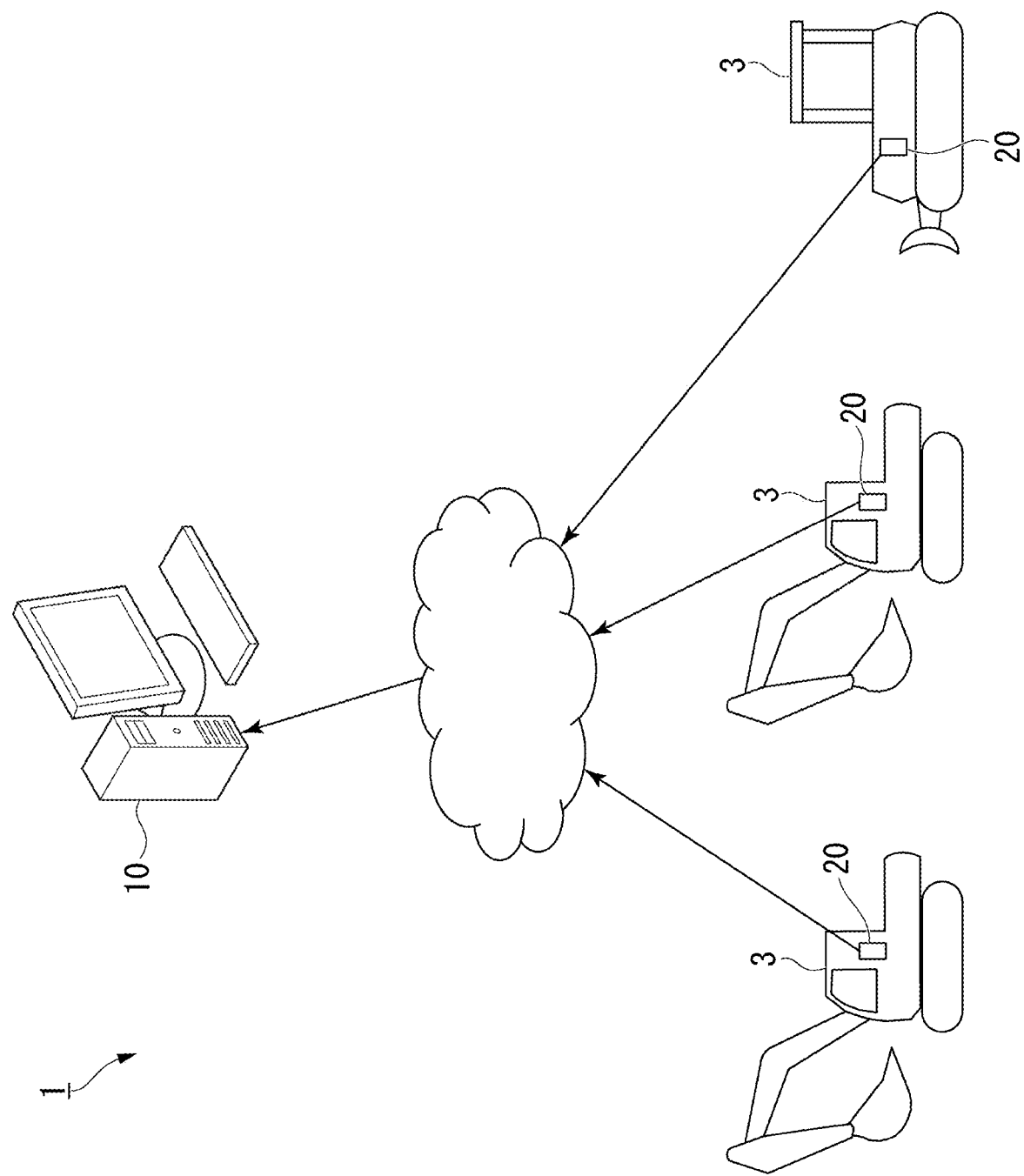
FIG. 1 is a diagram showing an overall configuration of an analysis assistance system according to a first embodiment.

Hereinafter, a reproduction apparatus according to a first embodiment and an analysis assistance system including the reproduction apparatus will be described in detail with reference to FIGS. 1 to 10.
(Overall Configuration of Analysis Assistance System)
FIG. 1 is a diagram showing an overall configuration of the analysis assistance system according to the first embodiment.

An analysis assistance system 1 includes a reproduction apparatus 10 and a data logger 20 mounted in each of a plurality of construction machines 3.

The construction machine 3 is a target of work analysis by the reproduction apparatus 10. Examples of the construction machine 3 include a hydraulic excavator, a wheel loader, and the like. Also, in the following description, the hydraulic excavator will be described as an example of the construction machine 3. Each construction machine 3 includes a plurality of sensors. The data logger 20 records and accumulates information indicating the state of the construction machine 3 acquired by the sensor in time-series order. Hereinafter, the information recorded by the data logger 20 indicating the state of the construction machine 3 at each time point is also described as log information. When an operation mechanism for operating the construction machine 3 is configured to operate the construction machine 3 using an electrical operation signal, information of the operation signal of the construction machine 3 may be recorded and accumulated in a time series and included in the log information. Also, the data logger 20 transmits the recorded log information to the reproduction apparatus 10 via a wide area communication network at regular time intervals. Also, the regular time interval is, for example, a five-minute interval. The reproduction apparatus 10 records the log information received from the data logger 20 in the recording medium.

A function of the reproduction apparatus 10 will be described below.

(Structure of Construction Machine)

Figure 2:
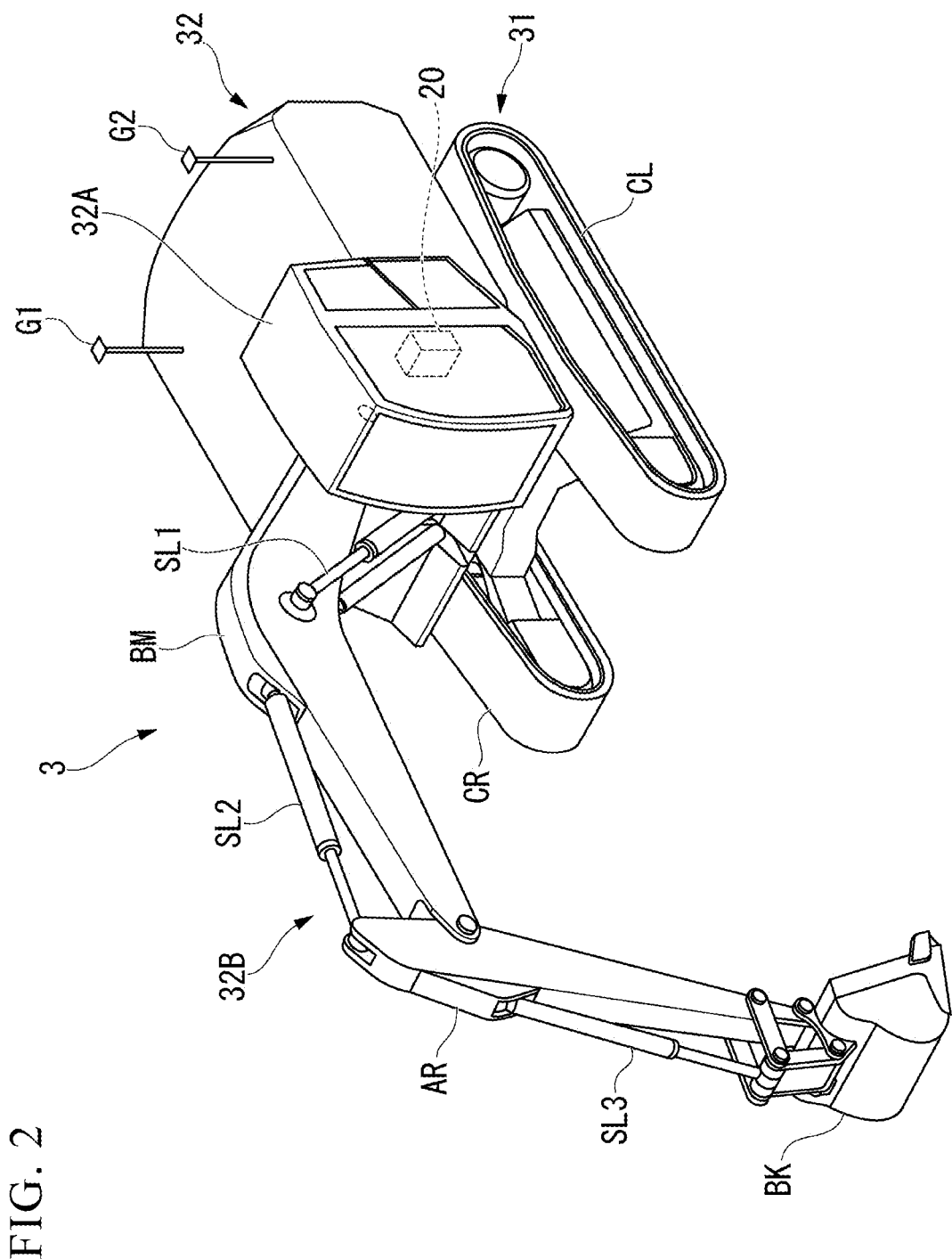
FIG. 2 is a diagram showing a structure of a construction machine according to the first embodiment.

FIG. 2 is a diagram showing a structure of the construction machine according to the first embodiment.

The construction machine 3, which is a hydraulic excavator, performs excavation and ground leveling on earth and the like at a work site or the like. As shown in FIG. 2, the construction machine 3, which is the hydraulic excavator, has an undercarriage 31 for running and an upper swing body 32 which is installed above the undercarriage 31 and is able to swing. Also, the upper swing body 32 includes a cab 32A, a work machine 32B, and two GPS antennas G1 and G2.

The undercarriage 31 has a left track CL and a right track CR. The construction machine 3 moves forward, swings, and moves backward according to rotations of the left track CL and the right track CR.

The cab 32A is a place where the operator of the construction machine 3 having boarded performs operations. The cab 32A is installed, for example, on a left side portion at a front end of the upper swing body 32. An internal configuration of the cab 32A will be described below.

The work machine 32B includes a boom BM, an arm AR, and a bucket BK. The boom BM is attached to the front end of the upper swing body 32. Also, the arm AR is attached to the boom BM. Also, the bucket BK is attached to the arm AR. Also, a boom cylinder SL1 is attached between the upper swing body 32 and the boom BM. By driving the boom cylinder SL1, the boom BM can be operated with respect to the upper swing body 32. An arm cylinder SL2 is attached between the boom BM and the arm AR. By driving the arm cylinder SL2, the arm AR can be operated with respect to the boom BM. A bucket cylinder SL3 is attached between the arm AR and the bucket BK. By driving the bucket cylinder SL3, the bucket BK can operate with respect to the arm AR.

The above-described upper swing body 32, boom BM, arm AR, and bucket BK provided in the construction machine 3, which is the hydraulic excavator, are in one mode of the movable parts of the construction machine 3.

(Configuration of Cab)

FIG. 3 is a diagram showing a configuration of the cab of the construction machine according to the first embodiment.

As shown in FIG. 3, operation levers L1 and L2, foot pedals F1 and F2, and running levers R1 and R2 are provided in the cab 32A.

The operation lever L1 and the operation lever L2 are disposed on the left and right of a seat ST within the cab 32A. Also, the foot pedal F1 and the foot pedal F2 are disposed in front of the seat ST and on a floor surface within the cab 32A.

An example of an operation pattern showing a corresponding relationship between input operations on the operation levers L1 and L2 and the running levers R1 and R2 and an operation on the construction machine 3, which is the hydraulic excavator, is as follows.

The operation lever L1 disposed on the left side when facing the front of the cab is an operation mechanism for performing a swing operation of the upper swing body 32 and an excavation/dumping operation of the arm AR. Specifically, when the operator of the construction machine 3 tilts the operation lever L1 forward, the arm AR performs a dumping operation. Also, when the operator of the construction machine 3 tilts the operation lever L1 backward, the arm AR performs an excavation operation. Also, when the operator of the construction machine 3 tilts the operation lever L1 in the right direction, the upper swing body 32 swings to the right. Also, when the operator of the construction machine 3 tilts the operation lever L1 in the left direction, the upper swing body 32 swings to the left. The upper swing body 32 may swing to the right or left when the operation lever L1 is tilted in a front-back direction and the arm AR may perform the dumping operation or the excavation operation when the operation lever L1 is tilted in a left-right direction.

The operation lever L2 disposed on the right side when facing the front of the cab is an operation mechanism for performing an excavation/dumping operation of the bucket BK and a raising/lowering operation of the boom BM. Specifically, when the operator of the construction machine 3 tilts the operation lever L2 forward, the lowering operation of the boom BM is executed. Also, when the operator of the construction machine 3 tilts the operation lever L2 backward, the raising operation of the boom BM is performed. Also, when the operator of the construction machine 3 tilts the operation lever L2 to the right, the dumping operation of the bucket BK is performed. Also, when the operator of the construction machine 3 tilts the operation lever L2 in the left direction, the excavation operation of the bucket BK is performed.

Also, the running levers R1 and R2 are operation mechanisms for performing operation control on the undercarriage 31, i.e., running control on the construction machine 3. The running lever R1 disposed on the left side when facing the front of the cab corresponds to rotational driving of the left track CL of the undercarriage 31. Specifically, when the operator of the construction machine 3 tilts the running lever R1 forward, the left track CL rotates in a forward direction. Also, when the operator of the construction machine 3 tilts the running lever R1 backward, the left track CL rotates in a backward direction.

The running lever R2 disposed on the right side when facing the front of the cab corresponds to rotational driving of the right track CR of the undercarriage 31. Specifically, when the operator of the construction machine 3 tilts the running lever R2 forward, the right track CR rotates in the forward direction. Also, when the operator of the construction machine 3 tilts the running lever R2 backward, the right track CR rotates in the backward direction. Also, the foot pedals F1 and F2 are interlocked with the running levers R1 and R2, respectively, and running can be controlled by the foot pedals F1 and F2.

Also, the above-described operation pattern is only an example, and is not limited to the above-described mode depending on a model of the hydraulic excavator and the like.

Also, according to the embodiment, the construction machine 3 described with reference to FIG. 2 may not include the GPS antennas G1 and G2.

(Functional Configuration of Reproduction Apparatus)

Figure 4:
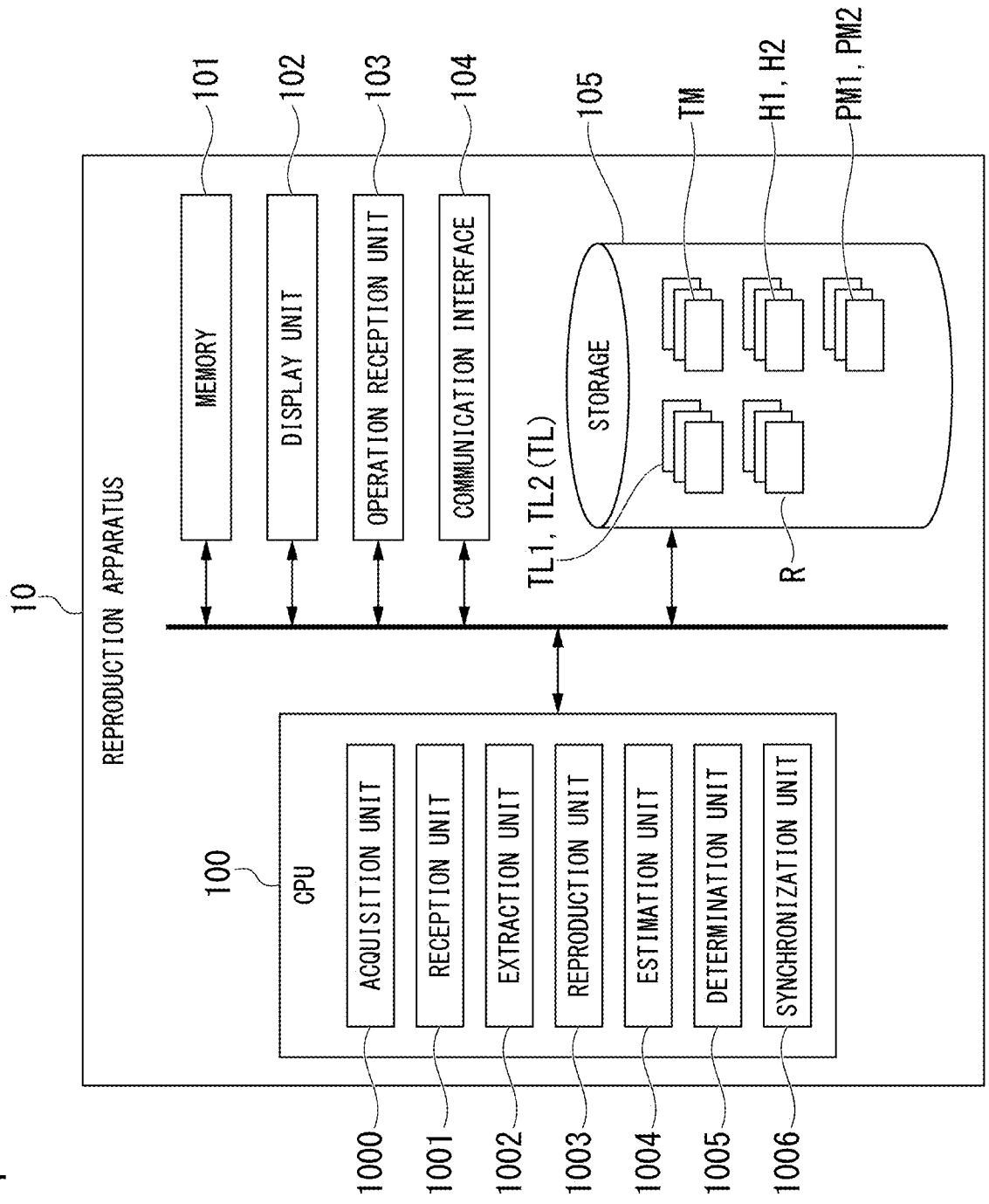
FIG. 4 is a diagram showing a functional configuration of a reproduction apparatus according to the first embodiment.

FIG. 4 is a diagram showing a functional configuration of the reproduction apparatus according to the first embodiment.

Hereinafter, the function of the reproduction apparatus 10 according to the first embodiment will be described with reference to FIG. 4.

As shown in FIG. 4, the reproduction apparatus 10 includes a CPU 100, a memory 101, a display unit 102, an operation reception unit 103, a communication interface 104, and a storage 105. Also, the CPU 100 may be a processor such as an FPGA or a GPU instead of the CPU.

The CPU 100 is a processor that controls the entire operation of the reproduction apparatus 10. Various functions of the CPU 100 will be described below.

The memory 101 is a so-called main storage apparatus. Instructions and data necessary for the CPU 100 to operate on the basis of the program are loaded into the memory 101.

The display unit 102 is a display device capable of visually displaying information and is, for example, a liquid crystal display, an organic EL display, or the like.

The operation reception unit 103 is an input device and is, for example, a general mouse, keyboard, touch sensor, or the like.

The communication interface 104 is a communication interface for communicating with the data logger 20.

The storage 105 is a so-called auxiliary storage apparatus and is, for example, a hard disk drive (HDD), a solid state drive (SSD), or the like. The storage 105 records log information TL received from the data logger 20, a vehicle type of the construction machine 3, a construction machine model TM provided in advance for each model, and the like. Also, the construction machine model TM will be described below. Also, a unit work prediction model PM1 and an element work prediction model PM2 used when the work content of the construction machine 3 is estimated, heat maps (H1, H2) generated in the estimation process, estimated work content R of the construction machine 3, and the like are also recorded in the storage 105. Also, the unit work prediction model PM1, the element work prediction model PM2, and the heat maps (H1, H2) will be described below.

The function of the CPU 100 of the reproduction apparatus 10 according to the first embodiment will be described in detail. The CPU 100 operates on the basis of a predetermined program and exhibits functions as an acquisition unit 1000, a reception unit 1001, an extraction unit 1002, a reproduction unit 1003, an estimation unit 1004, a determination unit 1005, and a synchronization unit 1006.

Also, the above-described predetermined program may be used for implementing some of the functions to be executed by the reproduction apparatus 10. For example, the program may cause its function to be executed in combination with another program already stored in the storage 105 or in combination with another program installed in another apparatus. Also, in another embodiment, the reproduction apparatus 10 may include a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions implemented by the processor may be implemented by the integrated circuit.

The acquisition unit 1000 acquires the log information TL serving as a reproduction target from a plurality of pieces of log information TL recorded and accumulated in the storage 105. Here, it is assumed that the plurality of pieces of log information TL are recorded in files recorded with different file names within the storage 105.

The acquisition unit 1000 acquires two pieces of the log information TL serving as a comparison target. One of the two pieces of the log information acquired by the acquisition unit 1000 is log information designated by the operator as a reproduction target, such as a file name. Hereinafter, the above log information will be referred to as designated log information TL1 (first log information). The other of the two pieces of the log information is log information that is reproduced simultaneously with the reproduction based on the designated log information TL1. Hereinafter, the above log information will be referred to as comparison log information TL2 (second log information). The comparison log information TL2 may be log information pre-selected as a "model" of the work content for each of various types of work content and conditions from the viewpoints of, for example, high fuel efficiency, short work time, and driving by an expert.

The acquisition unit 1000 according to the present embodiment automatically searches for and acquires the comparison log information TL2 which is appropriate as a comparison target of the designated log information TL1 on the basis of a determination result of the determination unit 1005 to be described below. However, the acquisition unit 1000 according to another embodiment is not limited to the above mode, and for example, the acquisition unit 1000 may be in a mode in which the log information designated by the operator such as a file name is acquired as the comparison log information TL2. Also, when only one piece of the comparison log information TL2 is recorded, the acquisition unit 1000 may be in a mode in which the one piece of the comparison log information TL2 is acquired.

The reception unit 1001 receives a predetermined reproduction instruction from the operator of the reproduction apparatus 10. For example, the reception unit 1001 receives a reproduction instruction for the construction machine 3 from the operator of the reproduction apparatus 10.

The extraction unit 1002 extracts angle information for use in the reproduction of the construction machine 3 from the acquired log information TL.

The reproduction unit 1003 applies the extracted angle information of the construction machine 3 to the construction machine model TM corresponding to the construction machine 3 and reproduces the information.

The estimation unit 1004 estimates the work content of the construction machine 3 at each time point from the acquired log information TL.

The determination unit 1005 determines whether or not the comparison log information TL2 is appropriate as a comparison target of the designated log information TL1 on the basis of the information included in the designated log information TL1.

The synchronization unit 1006 performs a process of synchronizing the reproduction of the construction machine model TM based on the designated log information TL1 and the reproduction of the construction machine model TM based on the comparison log information TL2. Specifically, the synchronization unit 1006 identifies a reproduction start time point on a time series of the animation of the construction machine model TM on the basis of the work content estimated by the estimation unit 1004.

(Processing Flow of Reproduction Apparatus)

Figure 5:
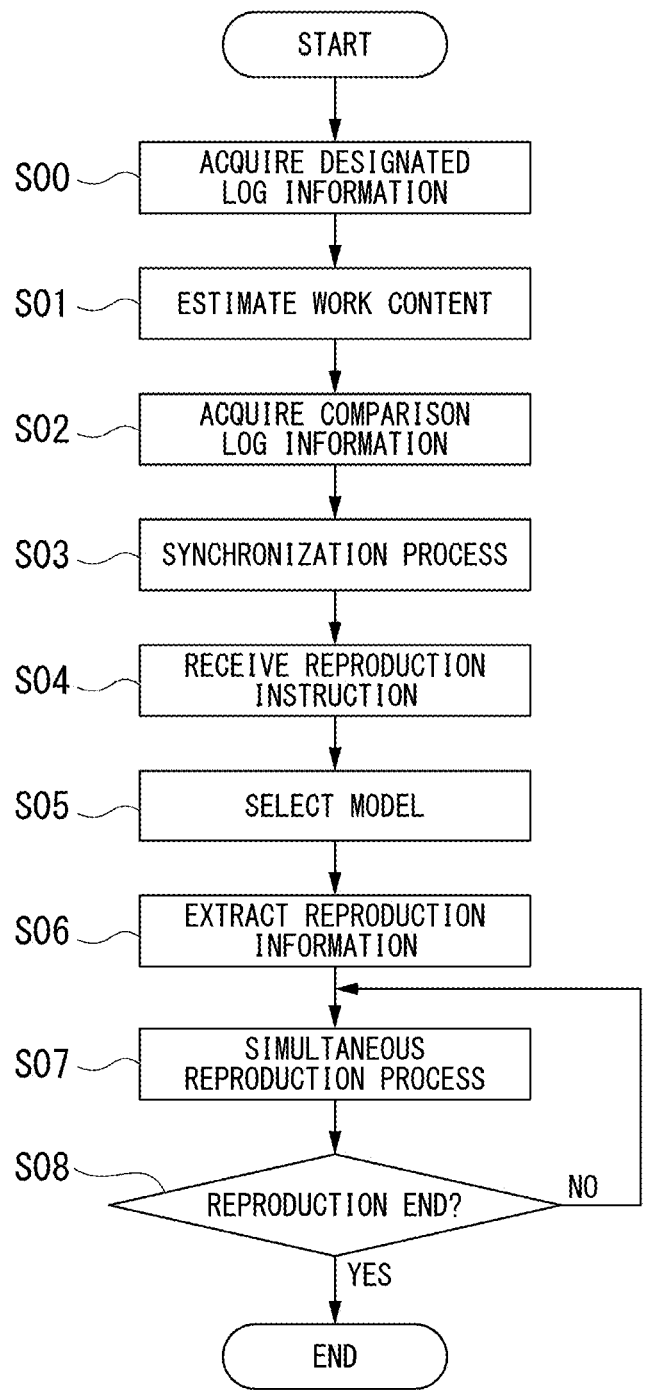
FIG. 5 is a diagram showing a processing flow of the reproduction apparatus according to the first embodiment.

FIG. 5 is a diagram showing a processing flow of the reproduction apparatus according to the first embodiment.

FIGS. 6 to 8 are first to third diagrams showing an example of log information according to the first embodiment.

Figure 9:
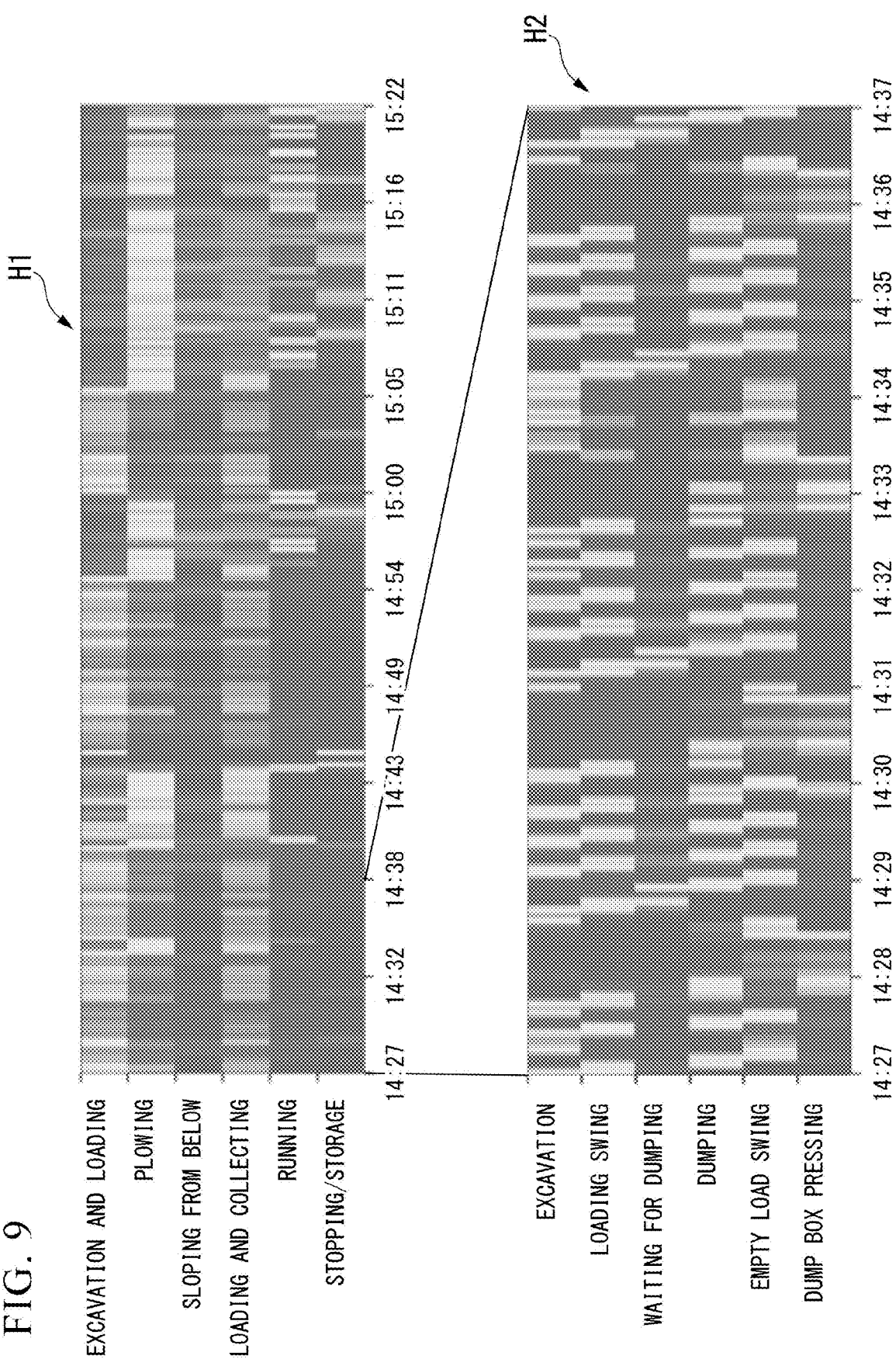
FIG. 9 is a diagram showing a heat map used for estimating work content according to the first embodiment.
Figure 10:
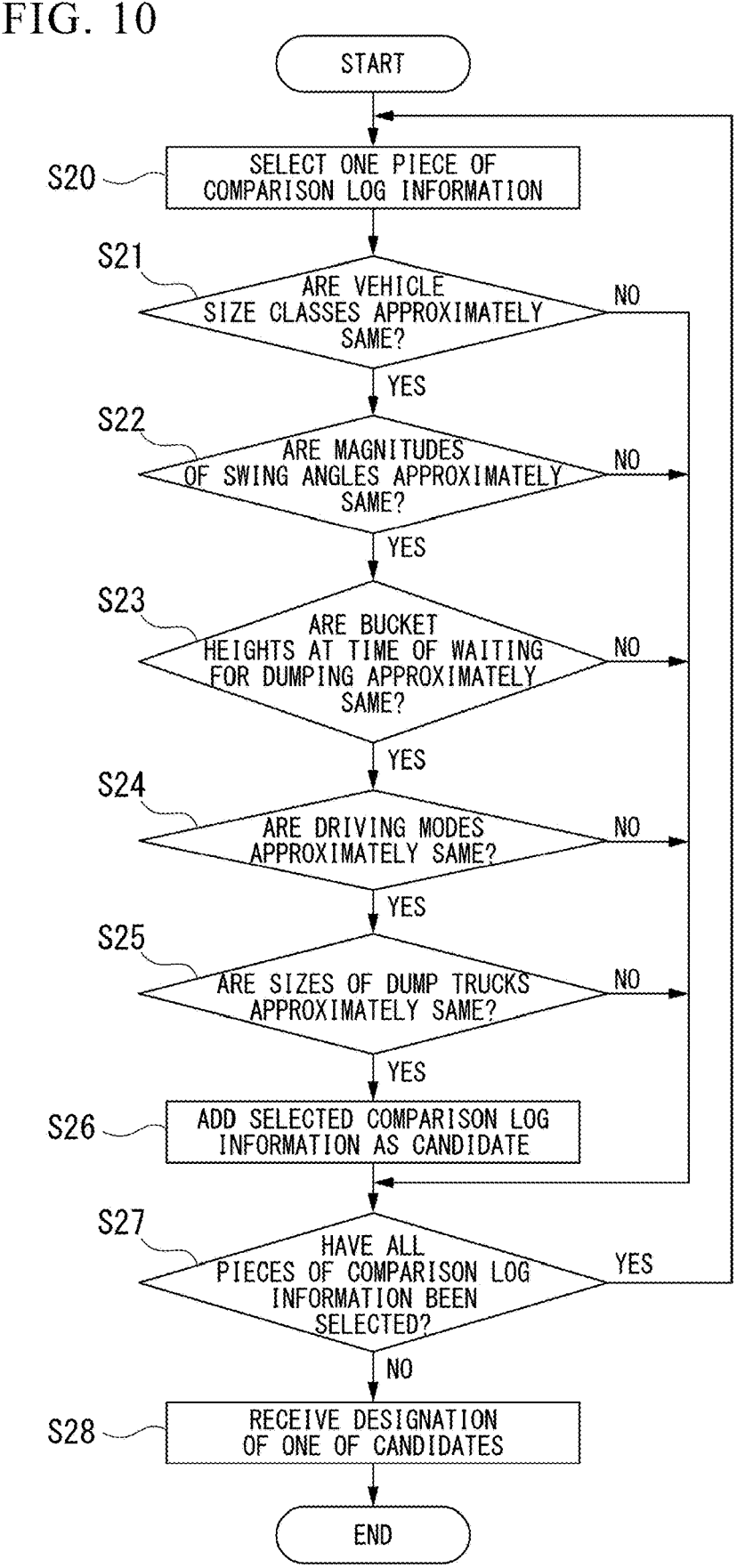
FIG. 10 is a diagram showing a flow of a process of a determination unit of the reproduction apparatus according to the first embodiment.
Figure 11:
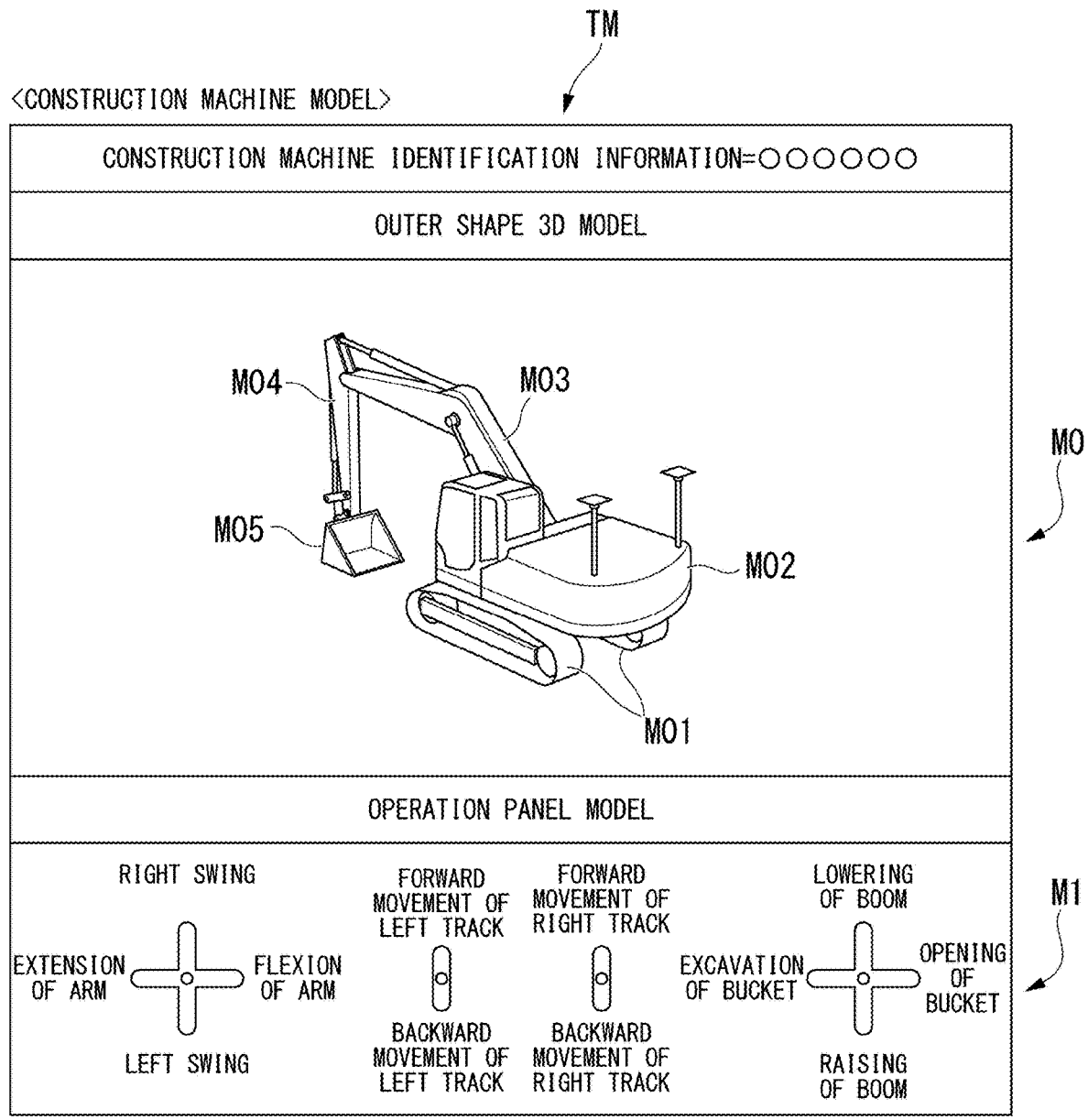
FIG. 11 is a diagram showing an example of a construction machine model according to the first embodiment.

FIG. 9 is a diagram showing a heat map used for estimating work content according to the first embodiment. FIG. 10 is a diagram showing a flow of a process of a determination unit of the reproduction apparatus according to the first embodiment. FIG. 11 is a diagram showing an example of a construction machine model according to the first embodiment.

Hereinafter, a flow of a specific process performed by the reproduction apparatus 10 will be described in detail with reference to FIGS. 5 to 11.

The processing flow shown in FIG. 5 is started from a time point when a dedicated application has been activated by the operator of the reproduction apparatus 10.

When the dedicated application is activated by the operation of the operator, the acquisition unit 1000 of the CPU 100 loads the designated log information TL1 designated as the reproduction target into the memory 101 and acquires the designated log information TL1 (step S00).

Here, the log information TL (the designated log information TL1 and the comparison log information TL2) will be described with reference to FIGS. 6 to 8.

As shown in FIGS. 6 to 8, the log information TL includes construction machine identification information. Specifically, the construction machine identification information is an individual identification number for individually identifying the construction machine 3. In FIGS. 6 to 8, it is assumed that the construction machine identification information is allocated in correspondence with a vehicle type, a model, a model code, a machine number, and the like of the construction machine 3 indicating the hydraulic excavator, the wheel loader, or the like. The construction machine identification information may include numeric characters, letters, symbols, a combination thereof, or the like as well as numbers.

As shown in FIG. 6, the log information TL includes information indicating a position and a posture of the construction machine 3 at each time point and angle information of the movable part of the construction machine 3. Specifically, a position of the construction machine 3, a roll angle of the construction machine 3, which is the tilt of the machine in the left-right direction, a pitch angle which is the tilt of the machine in the front-back direction, a swing angle, a boom angle, an arm angle, and a bucket angle are recorded in the log information TL for each time point. Here, the data logger 20 mounted in the construction machine 3 identifies and records the position of the construction machine 3 on the basis of positioning information indicating latitude and longitude which is, for example, information obtained through reception of the GPS antennas G1 and G2. Also, the data logger 20 calculates and records the roll angle and the pitch angle of the construction machine 3 on the basis of a measurement result of an inertial measurement unit (IMU) mounted in the construction machine 3. Also, the data logger 20 calculates and records the swing angle of the upper swing body 32 on the basis of the positioning information obtained from each of the GPS antennas G1 and G2 provided on the upper swing body 32. Further, the data logger 20 calculates and records the boom angle, the arm angle, and the bucket angle on the basis of expansion and contraction degrees of the boom cylinder SL1, the arm cylinder SL2, and the bucket cylinder SL3.

Also, the position, the roll angle, and the pitch angle are information necessary for identifying the position and the posture of the construction machine 3 itself. Thus, for example, in the embodiment in which only the movements of the movable parts of the construction machine 3, i.e., the upper swing body 32, the boom BM, the arm AR, and the bucket BK, are reproduced by animation, and the position and the posture of the construction machine 3 itself are not reproduced, the information of the position, the roll angle, and the pitch angle need not be included in the log information.

Also, as shown in FIG. 7, the log information TL includes a pilot oil pressure (a PPC pressure) indicating a degree of input of the operator on the operation lever L1 or L2 or the like at each time, i.e., a degree of lever tilting and a degree of pedal depression. Specifically, the PPC pressure of the operation lever L1 or L2, the running lever R1 or R2, the foot pedal F1 or F2, or the like corresponding to each of various types of operations by the operator corresponding to a left/right swing, excavation/dumping of the arm, raising/lowering of the boom, excavation/dumping of the bucket, forward/backward movement of the right track, and forward/backward movement of the left track is recorded for each time point. Also, each time point shown in FIG. 7 corresponds to one time point shown in FIG. 6.

Also, as shown in FIG. 8, the log information TL includes information indicating states of major drive mechanisms such as an engine and a hydraulic pump of the construction machine 3 at each time point. Specifically, an engine cooling water temperature, an engine output, instantaneous fuel consumption, and an oil temperature of the hydraulic pump are recorded in the log information TL for each time point. Also, each time point shown in FIG. 8 corresponds to one time point shown in FIGS. 6 and 7.

Also, as shown in FIG. 8, a driving mode and a transport vehicle ID for identifying a transport vehicle of a loading destination are recorded in the log information TL.

The driving mode includes, for example, a fuel consumption priority mode and a horsepower priority mode. In the fuel consumption priority mode, the output (horsepower) of the construction machine 3 is automatically limited so that the fuel consumption is at a certain level or lower. Because there is no such limitation in the horsepower priority mode, the work can be performed by causing the original horsepower performance of the construction machine 3 to be exhibited. The driving mode is not only freely switched by the operator of the construction machine 3, but may be automatically switched in accordance with a current state of the construction machine 3. For example, when a level of the fuel becomes less than or equal to a predetermined position during work, the construction machine 3 automatically switches the mode from the horsepower priority mode to the fuel consumption priority mode.

The transport vehicle ID is information for identifying the transport vehicle of the loading destination in the loading work currently being performed by the construction machine 3. A mode in which the transport vehicle ID may be acquired, for example, through wireless communication between the construction machine 3 and the transport vehicle, may be used or a mode in which the transport vehicle ID may be manually input to a terminal apparatus by the operator of the construction machine 3 using visual confirmation or the like may be used.

Returning to FIG. 5, the estimation unit 1004 of the CPU 100 estimates the work content of the construction machine 3 at each time point on the basis of the designated log information TL1 acquired in step S00 (step S01).

Here, a procedure in which the estimation unit 1004 estimates the work content of the construction machine 3 from the log information TL will be described with reference to FIG. 9. The estimation unit 1004 estimates the work content of the construction machine 3 with respect to both unit work and element work. The unit work is work for accomplishing one work purpose. The element work is work that represents a series of operations or work elements that are elements constituting the unit work and are classified according to a purpose.

Examples of the classification of unit work include "ditch excavation," "backfilling," "sloping (from above)," and the like in addition to "excavation and loading," "plowing," "sloping (from below)," "loading and collecting," "running," and "stopping/storage" shown in FIG. 9.

The excavation and loading are work of digging and scraping off earth or rocks, and loading the scraped earth or rocks on a dump box of a transport vehicle. The excavation and loading are unit work including excavation, a load swing, dumping, an empty load swing, waiting for dumping, and dump box pressing.

The plowing is work of scraping off the excess undulations of the ground so that the ground is flat at a predetermined height. The plowing is unit work that includes excavation and dumping or excavation, a loading swing, dumping, and an empty load swing and is able to include pushing and smoothing and brooming.

The slope (from below) is work of forming a slope using the construction machine 3 located below a target location. The slope (from below) is unit work that includes compaction, excavation, a loading swing, dumping, and an empty load swing and is able to include pushing and smoothing.

The loading and collecting are work of collecting earth generated by excavation or the like before the earth is loaded on the transport vehicle. The load collection is unit work that includes excavation, a loading swing, dumping, and an empty load swing and is able to include pushing and smoothing.

The running is work of moving the construction machine 3. The running serving as the unit work is unit work including running serving as element work.

The stopping/storage is a state in which there are no earth and rocks in the bucket BK and the bucket BK is stopped for a predetermined period or longer. The stopping/storage serving as the unit work is unit work including stopping serving as the element work.

The ditch excavation is work of digging the ground into a long and narrow groove and scraping off the earth or the like. The ditch excavation is unit work that includes excavation, a loading swing, dumping, and an empty load swing and is able to include pushing and smoothing.

The backfilling is work of putting earth into a groove or hole that is already open in the ground to backfill it and make it flat. The backfilling is unit work that includes excavation, a loading swing, dumping, compaction, and an empty load swing and is able to include pushing and smoothing and brooming.

The sloping (from above) is work of forming a slope using the construction machine 3 located above the target location. The sloping (from above) is unit work that includes compaction, excavation, a loading swing, dumping, and an empty load swing and is able to include pushing and smoothing.

Examples of the classification of elemental work include "compaction," "pushing and smoothing," "brooming," and the like in addition to "excavation," "loading swing," "waiting for dumping," "dumping," "empty load swing," and "dump box pressing" shown in FIG. 9.

The excavation is work of excavating earth or rocks and scraping off earth or rocks using the bucket BK.

The loading swing is work of causing the upper swing body 32 to swing while holding the scraped earth or rocks in the bucket BK.

The waiting for dumping is work of holding the scraped earth or rocks in the bucket BK while waiting for the transport vehicle for loading.

The dumping is work of dumping the scraped earth or rocks from the bucket BK to the transport vehicle or a predetermined place.

The empty load swing is work of causing the upper swing body 32 to swing in a state in which the bucket BK is free of earth and rocks.

The dump box pressing is work of flattening earth loaded on the dump box of the transport vehicle by pressing the earth with the bucket BK from above.

The compaction is work of pushing earth against the disturbed ground with the bucket BK to form the ground and strengthen it.

The pushing and smoothing are work of dispersing and smoothing the earth on a bottom surface of the bucket BK.

The brooming is work of dispersing and smoothing the earth on a side surface of the bucket BK.

The estimation unit 1004 obtains a time series of likelihoods associated with the unit work by inputting log information TL to a unit work prediction model PM1 in time-series order. The unit work prediction model PM1 is a model in which the likelihood associated with the unit work is output when the log information TL is input according to learning using teacher data, and, for example, may be stored in the storage 105.

Also, the estimation unit 1004 obtains a time series of likelihoods associated with the element work by inputting the log information TL to an element work prediction model PM2 in time-series order. The element work prediction model PM2 is a model in which the likelihood associated with the element work is output when the log information TL is input according to learning using teacher data, and, for example, may be stored in the storage 105.

The estimation unit 1004 smooths the time series of the likelihoods by applying the time series of the likelihoods associated with the unit work and the time series of the likelihoods associated with the element work to a time average filter and generates a unit work heat map H1 representing the smoothed time series of the likelihood associated with the unit work and an element work heat map H2 representing the smoothed time series of the likelihoods associated with the element work as shown in FIG. 9. The heat maps H1 and H2 are colored maps representing likelihoods of classifications of work on a plane in which the vertical axis represents a classification of work and the horizontal axis represents time on the basis of the smoothed time series of the likelihoods. For example, the color associated with the heat map may be close to blue as the likelihood of the classification of work is low and may be close to red as the likelihood of the classification of work is high. The estimation unit 1004 stores the heat maps H1 and H2 in the storage 105.

The estimation unit 1004 identifies a time period in which the likelihood of unit work is dominant on the basis of the smoothed time series of likelihoods and estimates the work content of the construction machine 3 for the time period. For example, in a time period in which the likelihood of "excavation and loading," which are unit work, is dominant, the work content of the construction machine 3 is estimated to be "excavation and loading." Likewise, the estimation unit 1004 identifies a time period in which the likelihood of the element work is dominant on the basis of the smoothed time series of the likelihoods, and estimates the work content of the construction machine 3 for the time period. For example, in the time period in which the likelihood of "excavation," which is element work, is dominant, the work content of the construction machine 3 is estimated to be "excavation." The estimation unit 1004 stores information of work content R estimated for the construction machine 3 in the storage 105.

Returning to FIG. 5, the acquisition unit 1000 subsequently acquires appropriate comparison log information TL2 as the comparison target of the designated log information TL1 acquired in step S00 (step S02).

At this time, the determination unit 1005 performs a flow of a determination process of determining whether or not a plurality of pieces of comparison log information TL2 recorded in the storage 105 are appropriate as the comparison target of the designated log information TL1 acquired in step S00. The above processing flow will be described with reference to FIG. 10.

First, the determination unit 1005 selects one from the plurality of pieces of comparison log information TL2 pre-recorded in the storage 105 (step S20).

Next, the determination unit 1005 determines whether or not the designated log information TL1 acquired in step S00 (FIG. 5) and the comparison log information TL2 selected in step S20 have been acquired from the construction machine 3 having a vehicle size class at an identical degree (step S21). Specifically, the determination unit 1005 identifies the vehicle size class of the construction machine 3 for which the designated log information TL1 is created on the basis of construction machine identification information included in the designated log information TL1. Subsequently, the determination unit 1005 identifies the vehicle size class of the construction machine 3 for which the comparison log information TL2 has been created on the basis of the construction machine identification information included in the comparison log information TL2. The determination unit 1005 determines whether or not the identified vehicle size classes are approximately the same.

When the vehicle size classes are approximately the same (step S21; YES), the determination unit 1005 moves to the next determination process (step S22). When the vehicle size classes are not approximately the same (step S21; NO), the determination unit 1005 moves to step S27 without adding the comparison log information TL2 selected in step S20 as the reproduction candidate.

Next, the determination unit 1005 determines whether or not amounts of change (magnitudes of swings) in swing angles of the construction machine 3 indicated in the designated log information TL1 acquired in step S00 (FIG. 5) and the comparison log information TL2 selected in step S20 are approximately the same (step S22). Specifically, the determination unit 1005 identifies the amount of change in the swing angle of the construction machine 3 for which the designated log information TL1 is created at the time of the collection swing and the empty load swing on the basis of the swing angle included in the designated log information TL1. Subsequently, the determination unit 1005 identifies the amount of change in the swing angle of the construction machine 3 for which the comparison log information TL2 is created at the time of the collection swing and the empty load swing on the basis of the swing angle included in the comparison log information TL2. The determination unit 1005 determines whether or not the respectively identified amounts of change in the swing angles are approximately the same.

When the amounts of change in the swing angles are approximately the same (step S22; YES), the determination unit 1005 moves to the next determination process (step S23). When the amounts of change in the swing angles are not approximately the same (step S22; NO), the determination unit 1005 moves to step S27 without adding the comparison log information TL2 selected in step S20 as the reproduction candidate.

Next, the determination unit 1005 determines whether or not bucket heights of the construction machine 3 indicated in the designated log information TL1 acquired in step S00 (FIG. 5) and the comparison log information TL2 selected in step S20 at the time of waiting for dumping are approximately the same (step S23). Specifically, the determination unit 1005 identifies the bucket height of the construction machine 3 for which the designated log information TL1 is created at the time of waiting for dumping on the basis of the boom angle, the arm angle, and the bucket angle included in the designated log information TL1. Subsequently, the determination unit 1005 identifies the bucket height of the construction machine 3 for which the comparison log information TL2 is created at the time of waiting for dumping on the basis of the boom angle, the arm angle, and the bucket angle included in the comparison log information TL2. The determination unit 1005 determines whether or not the respectively identified bucket heights at the time of waiting for dumping are approximately the same.

When the bucket heights at the time of waiting for dumping are approximately the same (step S23; YES), the determination unit 1005 moves the next determination process (step S24). When the bucket heights at the time of waiting for dumping are not approximately the same (step S23; NO), the determination unit 1005 moves to step S27 without adding the comparison log information TL2 selected in step S20 as the reproduction candidate.

Next, the determination unit 1005 determines whether or not driving modes of the construction machine 3 indicated in the designated log information TL1 acquired in step S00 (FIG. 5) and the comparison log information TL2 selected in step S20 are the same (step S24). Specifically, the determination unit 1005 identifies the driving mode of the construction machine 3 for which the designated log information TL1 is created with reference to the driving mode indicated in the designated log information TL1. Subsequently, the determination unit 1005 identifies the driving mode of the construction machine 3 for which the comparison log information TL2 is created with reference to the driving mode indicated in the comparison log information TL2. The determination unit 1005 determines whether or not the respectively identified driving modes are the same.

When the driving modes are the same (step S24; YES), the determination unit 1005 moves to the next determination process (step S25). When the driving modes are not the same (step S24; NO), the determination unit 1005 moves to step S27 without adding the comparison log information TL2 selected in step S20 as the reproduction candidate.

Next, the determination unit 1005 determines whether or not sizes of transport vehicles serving as the loading targets of the construction machine 3 indicated in the designated log information TL1 acquired in step S00 (FIG. 5) and the comparison log information TL2 selected in step S20 are approximately the same (step S25). Specifically, the determination unit 1005 identifies the size of the transport vehicle serving as the loading target of the construction machine 3 for which the designated log information TL1 is created with reference to a transport vehicle ID indicated in the designated log information TL1. Subsequently, the determination unit 1005 identifies the size of the transport vehicle serving as the loading target of the construction machine 3 for which the comparison log information TL2 is created with reference to a transport vehicle ID indicated in the comparison log information TL2. The determination unit 1005 determines whether or not the respectively identified sizes of the transport vehicles are approximately the same.

When the sizes of the transport vehicles serving as the loading targets are approximately the same (step S25; YES), the determination unit 1005 adds the comparison log information TL2 selected in step S20 as the reproduction candidate (step S26). When the sizes of the transport vehicles serving as the loading targets are not approximately the same (step S25; NO), the determination unit 1005 moves to step S27 without adding the comparison log information TL2 selected in step S20 as the reproduction candidate.

The determination unit 1005 determines whether or not all the comparison log information recorded in the storage 105 has been selected (step S27). When all the comparison log information has not been selected (step S27; NO), the determination unit 1005 returns to step S20, selects one piece of new comparison log information TL2, and performs a determination process similar to the above determination process.

When all the comparison log information has been selected (step S27; YES), the determination unit 1005 receives the designation of one piece of the comparison log information TL2 from the reproduction candidates from the operator (step S28). The acquisition unit 1000 acquires the comparison log information TL2 designated in step S28.

Also, when there is only one piece of comparison log information TL2 added as the reproduction candidate as a result of the processing of steps S20 to S27, the determination unit 1005 may omit a process of receiving the designation from the operator. Also, when there is no comparison log information TL2 added as the reproduction candidate as a result of the processing of steps S20 to S27, the determination unit 1005 may notify the operator that there is no comparison log information TL2 added as the reproduction candidate.

Also, the order of the determination processes of steps S21 to S25 described above can be appropriately changed. In another embodiment, the order is not limited to the order shown in FIG. 10. Also, in another embodiment, a mode in which it is not necessary to perform all of steps S21 to S25 and at least one of steps S21 to S25 is performed may be used.

Also, the determination unit 1005 according to another embodiment may narrow down the number of reproduction candidates on the basis of the work position, the work time, the classification of work, and the like in addition to the above-described determination processes of steps S21 to S25.

Returning to FIG. 5, subsequently, the synchronization unit 1006 performs a process of synchronizing animation reproduction of the construction machine model TM based on the designated log information TL1 and animation reproduction of the construction machine model TM based on the comparison log information TL2. Specifically, the synchronization unit 1006 identifies a reproduction start time point on a time series in the animation of the construction machine model TM based on the designated log information TL1 and a reproduction start time point on a time series in the animation of the construction machine model TM based on the comparison log information TL2.

The method of identifying the reproduction start time point for synchronizing the two is as follows. That is, the synchronization unit 1006 extracts a timing of switching from waiting for dumping to dumping in the designated log information TL1 on the basis of the element work heat map H1 for the designated log information TL1 generated by the estimation unit 1004. Next, the synchronization unit 1006 extracts a timing of switching from waiting for dumping to dumping in the comparison log information TL2 on the basis of the element work heat map H2 for the comparison log information TL2 generated by the estimation unit 1004. The synchronization unit 1006 selects one of the extracted timings and identifies the selected timing as the reproduction start time point of each animation.

Also, the reproduction apparatus 10 according to another embodiment is not limited to the above mode. For example, the reproduction apparatus 10 (the synchronization unit 1006) according to another embodiment may compare a combination of angle information of the boom, the arm, the bucket, and the like in the comparison log information TL2 with a combination of angle information of the boom, the arm, the bucket, and the like in the designated log information TL1, extract a timing when both angles are close to each other, and identify the extracted timing as the reproduction start time point of each animation.

Next, the reception unit 1001 receives a reproduction instruction from the operator (step S04). As one mode of the reproduction instruction, an operation such as pressing a reproduction button may be used. Also, the reproduction instruction including information indicating a starting point of reproduction such as a time point, a position of the construction machine 3, and various types of events such as an abnormality occurs in the construction machine 3 may be issued.

Next, the acquisition unit 1000 selects and reads the construction machine model TM corresponding to the construction machine identification information that has been referred to from the storage 105 on the basis of construction machine identification information indicating a type of the construction machine 3 received by the reception unit 1001 (step S05).

Here, the construction machine model TM will be described with reference to FIG. 11.

As shown in FIG. 11, the construction machine model TM is information including the construction machine identification information, an outer shape 3D model M0 and an operation panel model M1 of the construction machine 3 indicated in the construction machine identification information, and the like. The outer shape 3D model M0 is a 3D model representing the construction machine 3, and is constructed for each part of the construction machine 3 such as the undercarriage or the upper swing body. For example, the outer shape 3D model M0 represents a shape of the construction machine 3. For example, the outer shape 3D model M0 includes an undercarriage-specific outer shape model M01 representing the undercarriage 31 of the construction machine 3, an upper swing body-specific outer shape model M02 representing the upper swing body 32, a boom-specific outer shape model M03 representing the boom BM, an arm-specific outer shape model M04 representing the arm AR, and a bucket-specific outer shape model M05 representing the bucket BK.

The operation panel model M1 is a model representing the operation panel of the construction machine 3 identified by the construction machine identification information and reproduces input directions and input degrees corresponding to the operation levers L1 and L2 and the running levers R1 and R2 according to inputs by the operator of the construction machine 3. The operation panel model M1 includes information indicating association of types of operations of the construction machine 3 (a right/left swing, excavation/dumping of the arm, raising/lowering of the boom, excavation/dumping of the bucket, forward/backward movement of the right track, forward/backward movement of the left track (see FIG. 7)) and types of input operations of the operator of the construction machine 3 (a forward direction associated with the operation lever L1, a right direction associated with the operation lever L2, and the like).

Returning to FIG. 5, the extraction unit 1002 extracts information to be used for reproduction from each piece of the designated log information TL1 and the comparison log information TL2 (step S06). For example, the extraction unit 1002 extracts various types of angle information such as a boom angle, an arm angle, and a bucket angle as the information to be used for reproduction. Also, the pilot oil pressure shown in FIG. 7 may be extracted as the information used for reproduction. Also, in step S00 and step S02, only the information to be used for reproduction may be acquired.

Next, the reproduction unit 1003 executes simultaneous reproduction of the animation of the construction machine model TM based on the designated log information TL1 and the animation of the construction machine model TM based on the comparison log information TL2 (step S07). Here, the reproduction unit 1003 reproduces the animation of the reproduction of the operation of the construction machine 3 while applying various types of information recorded in the designated log information TL1 to the construction machine model TM from the reproduction start time point identified in the synchronization process of step S03 in order from the oldest timestamp. Simultaneously with the above animation reproduction, the reproduction unit 1003 reproduces the animation of the reproduction of the operation of the construction machine 3 while applying various types of information recorded in the comparison log information TL2 to the construction machine model TM from the reproduction start time point identified in the synchronization process of step S03 in order from the oldest timestamp.

Hereinafter, processing content of the reproduction unit 1003 will be described in detail. The reproduction unit 1003 changes an angle of a corresponding portion of the outer shape 3D model M0 on the basis of various types of angle information such as the swing angle and the boom angle indicated in the log information TL (the designated log information TL1 and the comparison log information TL2). For example, the reproduction unit 1003 reproduce a position and a posture of the bucket BK of the construction machine 3 by tilting the bucket-specific outer shape model M05 around the rotation axis defined at a connection position associated with the arm-specific outer shape model M04 so that the bucket-specific outer shape model M05 has the bucket angle indicated in the log information TL.

Likewise, the reproduction unit 1003 reproduces a position and a posture of the arm AR of the construction machine 3 by tilting the arm-specific outer shape model M04 around the rotation axis defined at the connection position associated with the boom-specific outer shape model M03 so that the arm-specific outer shape model M04 has the arm angle indicated in the log information TL.

Likewise, the reproduction unit 1003 reproduces a position and a posture of the upper swing body 32 of the construction machine 3 by tilting the upper swing body-specific outer shape model M02 around the rotation axis defined at a connection position associated with the undercarriage-specific outer shape model M01 so that the upper swing body-specific outer shape model M02 has the swing angle indicated in the log information TL.

Likewise, the reproduction unit 1003 reproduces a position and a posture of the upper swing body 32 of the construction machine 3 by tilting the undercarriage-specific outer shape model M01 around a roll rotation axis defined in the undercarriage-specific outer shape model M01 so that the undercarriage-specific outer shape model M01 has a roll angle indicated in the log information TL and tilting the undercarriage-specific outer shape model M01 around a pitch rotation axis defined in the undercarriage-specific outer shape model M01 so that the undercarriage-specific outer shape model M01 has a pitch angle indicated in the log information TL.

Also, the reproduction apparatus 10 according to the first embodiment can reproduce an animation of the running of the construction machine 3 on the basis of the PPC pressures of the forward/backward movement of the right track and the forward/backward movement of the left track included in the log information TL at each time point.

Specifically, the outer shape 3D model M0 is moved forward, backward, left and right forward, and left and right backward on the basis of the PPC pressures of the forward/backward movement of the right track and the forward/backward movement of the left track. For example, the outer shape 3D model M0 is moved forward on the basis of numerical values of the PPC pressures of the forward movement of the right track and the forward movement of the left track. A moving speed may be changed on the basis of the numerical value of the PPC pressure.

Also, the outer shape 3D model M0 is moved backward on the basis of numerical values of the PPC pressures of the backward movement of the right track and the backward movement of the left track. Also, the outer shape 3D model M0 is moved to curve in forward left and right directions on the basis of a difference between the numerical values of the PPC pressures of the forward movement of the right track and the forward movement of the left track. For example, if the numerical value of the PPC pressure of the forward movement of the right track is larger than the numerical value of the PPC pressure of the forward movement of the left track, the outer shape 3D model M0 is moved to curve in the forward left direction. The speed of the movement and the size of the curve may be changed according to the numerical values of the PPC pressures and a difference between the numerical values of the PPC pressures.

Likewise, the outer shape 3D model M0 is moved to curve in backward left and right directions on the basis of a difference between the numerical values of the PPC pressures of the backward movement of the right track and the backward movement of the left track. For example, if the numerical value of the PPC pressure of the backward movement of the right track is larger than the numerical value of the PPC pressure of the backward movement of the left track, the outer shape 3D model M0 is moved to curve in the backward left direction. The speed of the movement and the size of the curve may be changed in accordance with the numerical values of the PPC pressures and a difference between the numerical values of the PPC pressures.

In addition to the PPC pressures of the forward/backward movement of the right track and the forward/backward movement of the left track, the running of the construction machine 3 can be animated more accurately by performing reproduction using the position information. In this case, the moving speed and position of the construction machine 3 can be expressed more accurately using the position information. Also, it is possible to reproduce the tilt of the construction machine 3 in the left-right direction or the tilt of the construction machine 3 in the front-back direction at the time of running by reproducing the animation of the construction machine 3 on the basis of the roll angle, the pitch angle, or both the roll angle and the pitch angle, in addition to the PPC pressures of the forward/backward movement of the right track and the forward/backward movement of the left track.

Further, the reproduction unit 1003 reproduces animations of input operations for various types of operation levers and running levers by the operator of the construction machine 3 by applying the PPC pressures of the operation levers L1 and L2 and the running levers R1 and R2 for each of types of operations indicated in the log information TL to the operation panel model M1 of the construction machine model TM in order from the oldest timestamp. The reproduction unit 1003 simultaneously reproduces the animation on the same screen while aligning reproduction time points of the outer shape 3D model M0 and the operation panel model M1.

The reproduction unit 1003 determines whether or not to end the animation reproduction during the animation reproduction of operations of two construction machines 3 (step S08). For example, when a reproduction end instruction based on pressing of a stop button or the like has been received, it is determined that the animation reproduction is to be ended. It may be determined that the animation reproduction is to be ended when a predetermined period has elapsed from the start of the animation reproduction. When the animation reproduction has not ended (step S08; NO), the reproduction unit 1003 continues the simultaneous animation reproduction of two construction machine models TM. On the other hand, when the animation reproduction has ended (step S08; YES), the reproduction unit 1003 ends the animation reproduction process.

Steps S00, S01, S03, S04, S05, S06, and S08 of the processing flow described with reference to FIG. 5 are not essential steps of the reproduction apparatus 10 and the above steps may not be provided in other embodiments.

(Display Screen of Reproduction Apparatus)

Figure 12:
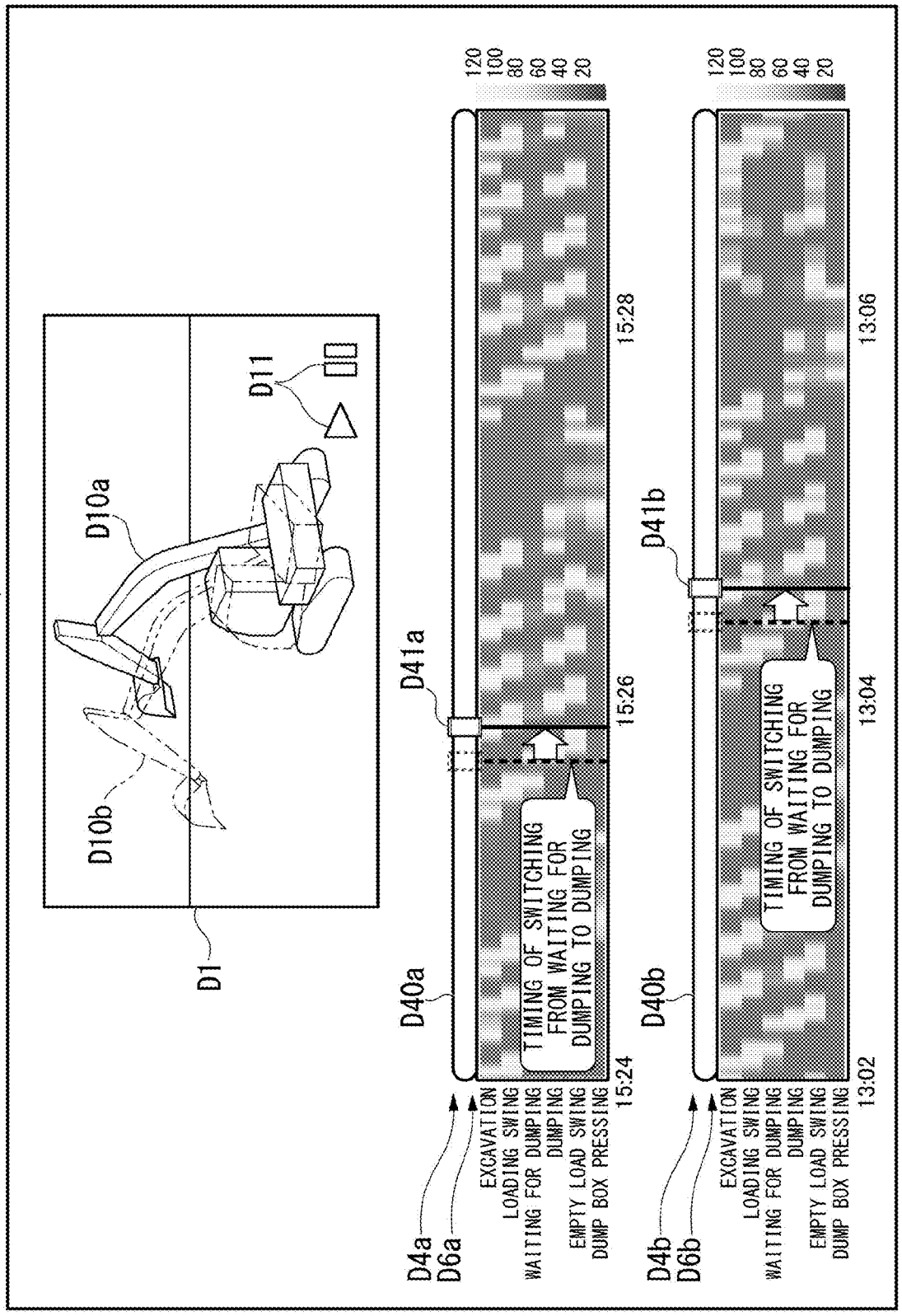
FIG. 12 is a diagram showing an example of a display image according to the first embodiment.

FIG. 12 is a diagram showing an example of a display screen of the reproduction apparatus according to the first embodiment.

For example, the CPU 100 of the reproduction apparatus 10 according to the first embodiment causes the display unit 102 to display a display image D as shown in FIG. 12.

The display image D is configured to include an outer shape 3D model display image D1, time scroll bars D4a and D4b, and heat map images D6a and D6b.

The outer shape 3D model display image D1 has an area where two outer shape 3D models M0 are drawn to overlap each other and simultaneously reproduced by animation. In the outer shape 3D model display image D1, a construction machine model image D10a to which various types of information such as a boom angle, an arm angle, and a bucket angle included in the designated log information TL1 are applied is drawn in the outer shape 3D model M0 (FIG. 11). Further, in the outer shape 3D model display image D1, a construction machine model image D10b to which various types of information such as a boom angle, an arm angle, and a bucket angle included in the comparison log information TL2 is applied is drawn to overlap the construction machine model image D10a in the outer shape 3D model M0.

Also, the reproduction apparatus 10 according to the other embodiment may be in a mode in which the two outer shape 3D models M0 are displayed side by side instead of displaying the two outer shape 3D models M0 in an overlapping way. In this case, they may be displayed on two displays disposed side by side.

Also, a button image D11 for the operator of the reproduction apparatus 10 for issuing a simultaneous animation reproduction instruction, a pause instruction, and the like is drawn on the outer shape 3D model display image D1.

Time scroll bars D4a and D4b are scroll bars for controlling animation reproduction and are scroll bars corresponding to animation reproduction based on the designated log information TL1 and animation reproduction based on the comparison log information TL2, respectively.

Bar images D40a and D40b representing the time axis from the start time to the end time and reproduction time icons D41a and D41b corresponding to time points during reproduction within the time axes indicated by the bar images D40a and D40b are drawn on the time scroll bars D4a and D4b. The reproduction time icons D41a and D41b are drawn at positions corresponding to reproduction time points in each of the bar images D40a and D40b. The operator can change a reproduction time point of the animation reproduction based on the designated log information TL1 to a desired reproduction time point by performing an operation of causing the reproduction time icon D41a to slide on the bar image D40a. Also, the operator can change the reproduction time point of the animation reproduction based on the comparison log information TL2 to a desired reproduction time point by performing an operation of causing the reproduction time icon D41b to slide on the bar image D40b.

For example, as shown in FIG. 12, the reproduction start time point of the animation reproduction based on the designated log information TL1 is set to coincide with a timing of switching from "waiting for dumping" to "dumping" in the heat map image D6a. Likewise, the reproduction start time point of the animation reproduction based on the comparison log information TL2 is set to coincide with a timing of switching from "waiting for dumping" to "dumping" in the heat map image D6b.

Alternatively, the reproduction apparatus 10 sets a position to which the reproduction time icon D41a is slid on the bar image D40a as the reproduction start time point of animation reproduction based on the designated log information TL1. The work classification at the reproduction start time point of the animation reproduction based on the comparison log information TL2 may be the same as the work classification at the reproduction start time point of the animation reproduction based on the designated log information TL1. The reproduction start time point of the animation reproduction based on the comparison log information TL2 may be a reproduction start time point at which the angle information is close to a combination of angle information of the boom, the arm, the bucket, and the like in the comparison log information TL1.

When the simultaneous reproduction instruction has been received from the operator, the reproduction apparatus 10 performs simultaneous animation reproduction from the reproduction start time point set on the time scroll bars D4a and D4b. In this case, as the animation reproduction progresses, the reproduction time icon D41a slides on the bar image D40a to the right of the screen and simultaneously the reproduction time icon D41b slides on the bar image D40b to the right of the screen.

The heat map images D6a and D6b are colored maps representing likelihoods of classifications of work on a plane in which the vertical axis represents a classification of work and the horizontal axis represents time, and the heat map images D6a and D6b are that the element work heat map H2 generated by the estimation unit 1004 which is displayed on a display screen. Time points on the horizontal axis of the heat map images D6a and D6b are displayed in correspondence with times displayed on the time scroll bars D4a and D4b, respectively. As shown in FIG. 12, "excavation," "collection swing," "waiting for dumping," "dumping," "empty load swing," and "dump box pressing" indicating classifications of element work of rows are shown on the left side of the heat map image D6. A relationship between the likelihood and the color is displayed on the right side of the heat map images D6a and D6b.

Although the element work heat map H2 is displayed as the heat map images D6a and D6b in FIG. 12, the unit work heat map H1 may be displayed as the heat map images D6a and D6b. Also, although the heat map images D6a and D6b have a six-row configuration in FIG. 12, the heat map images D6a and D6b may have any row configuration in accordance with the displayed unit work or element work.

Although a case in which the display image D is configured to include the outer shape 3D model display image D1 on which the animation is displayed, the two time scroll bars D4a and D4b, and the two heat map images D6a and D6b has been described with reference to FIG. 12, other embodiments are not limited thereto. For example, a mode in which the display image D may include only the outer shape 3D model display image D1 in which the simultaneous animations of the two construction machine model images D10a and D10b are displayed may be provided.

Also, a mode in which the scroll bar D4b and the heat map image D6b corresponding to the animation reproduction based on the comparison log information TL2 are not displayed in FIG. 12 may be provided.

Action and Effect

As described above, the reproduction apparatus 10 according to the first embodiment includes the acquisition unit 1000 configured to acquire the log information TL (the designated log information TL1 and the comparison log information TL2) of the construction machine 3 associated with a time point; the reception unit 1001 configured to receive an instruction for reproducing an operation of the construction machine 3; the reproduction unit 1003 configured to reproduce an operation of the construction machine 3 by sequentially applying angle information of the construction machine 3 included in the log information TL to the construction machine model TM when the reproduction instruction has been received; and the synchronization unit 1006 configured to synchronize the reproduction of the construction machine model TM based on the designated log information TL1 and the reproduction of the construction machine model TM based on the comparison log information TL2.

Thereby, the two construction machine model TMs are synchronized and the animation is reproduced, so that the operator can clearly ascertain a difference between operations of the two construction machines. That is, a movement difference between two different construction machines can be easily ascertained.

Also, the reproduction apparatus 10 according to the first embodiment sets a timing at which the operation of the construction machine 3 switches from predetermined work (for example, waiting for dumping) to other predetermined work (for example, dumping) as a reproduction start time point.

Thereby, because simultaneous reproduction is performed from the same work of two different construction machine models, it is possible to synchronize animation reproduction processes based on the two pieces of the log information TL.

In particular, because it is possible to achieve synchronization on the basis of start time points of loading into transport vehicles for the two construction machines 3 by achieving synchronization at the timing of switching from waiting for dumping to dumping, it is possible to clearly ascertain the differences (good, bad, or the like) in the loading work of the two construction machines 3.

Also, the reproduction apparatus 10 according to the first embodiment is characterized in that the comparison log information TL2 including information having a predetermined relationship with the information included in the designated log information TL1 is acquired.

Thereby, in the simultaneous animation reproduction associated with the designated log information TL1, the comparison log information TL2 suitable for comparison is selected.

In particular, the reproduction apparatus 10 according to the first embodiment acquires the comparison log information TL2 for which an amount of change in a swing angle (a magnitude of a swing) indicated in the designated log information TL1 and an amount of change in a swing angle indicated in the comparison log information TL2 are approximately the same, i.e., a difference between the two amounts is within a predetermined range.

Here, even if movements of the two construction machines 3 having significantly different amounts of change in the swing angles are reproduced at the same time, it is unlikely that a lot of knowledge can be obtained by comparing them. Therefore, it is possible to compare the movements of the two construction machines 3 having the same amount of change in the swing angles using the simultaneous animation reproduction by performing the process as described above.

Further, the reproduction apparatus 10 according to the first embodiment acquires the comparison log information TL2 for which a bucket height in the waiting for dumping indicated in the designated log information TL1 and a bucket height in the waiting for dumping indicated in the comparison log information TL2 are approximately the same, i.e., a difference between the two bucket heights is within a predetermined range.

Here, there is a possibility that the two construction machines 3 having significantly different bucket heights in the waiting for dumping will have a significantly different positional relationship with the transport vehicle in the height direction. Even if the movements of the two construction machines are reproduced at the same time, it is unlikely that a lot of knowledge can be obtained by comparing them. Therefore, it is possible to compare the movements of the two construction machines 3 having the same bucket height in the waiting for dumping using the simultaneous animation reproduction by performing the process as described above.

Further, the reproduction apparatus 10 according to the first embodiment acquires the comparison log information TL2 so that a vehicle size class of the construction machine 3 indicated in the designated log information TL1 is approximately the same as a vehicle size class of the construction machine 3 indicated in the comparison log information TL2.

Here, even if the movements of two construction machines with significantly different vehicle size classes are reproduced at the same time, it is unlikely that a lot of knowledge can be obtained by comparing them. Therefore, it is possible to compare the movements of the two construction machines 3 whose vehicle size classes are approximately the same by performing the process as described above.

Further, the reproduction apparatus 10 according to the first embodiment acquires the comparison log information TL2 so that a driving mode of the construction machine 3 indicated in the designated log information TL1 is the same as a driving mode of the construction machine 3 indicated in the comparison log information TL2.

Here, even if the movements of two construction machines whose horsepower capable of being output significantly differs according to a difference in the driving mode are reproduced at the same time, it is unlikely that a lot of knowledge can be obtained by comparing them. Therefore, it is possible to compare the movements of the two construction machines 3 in the same driving mode by performing the process as described above.

Further, the reproduction apparatus 10 according to the first embodiment acquires the relatively long log information TL2 for which a size of the transport vehicle serving as the loading target indicated in the designated log information TL1 and a size of the transport vehicle serving as the loading target indicated in the comparison log information TL2 are approximately the same.

Here, if the size of the transport vehicle serving as the loading target differs significantly, the movement of the loading work will change significantly accordingly. Therefore, even if the movements of the above two construction machines are reproduced at the same time, it is unlikely that a lot of knowledge can be obtained by comparing them. Therefore, it is possible to compare the movements of the two construction machines 3 for which the sizes of the transport vehicles serving as the loading targets are approximately the same by performing the process as described above.

Modified Examples of First Embodiment

Although the reproduction apparatus 10 according to the first embodiment and the analysis assistance system 1 including the reproduction apparatus 10 have been described in detail above, other embodiments are not limited to the above modes.

Figure 13:
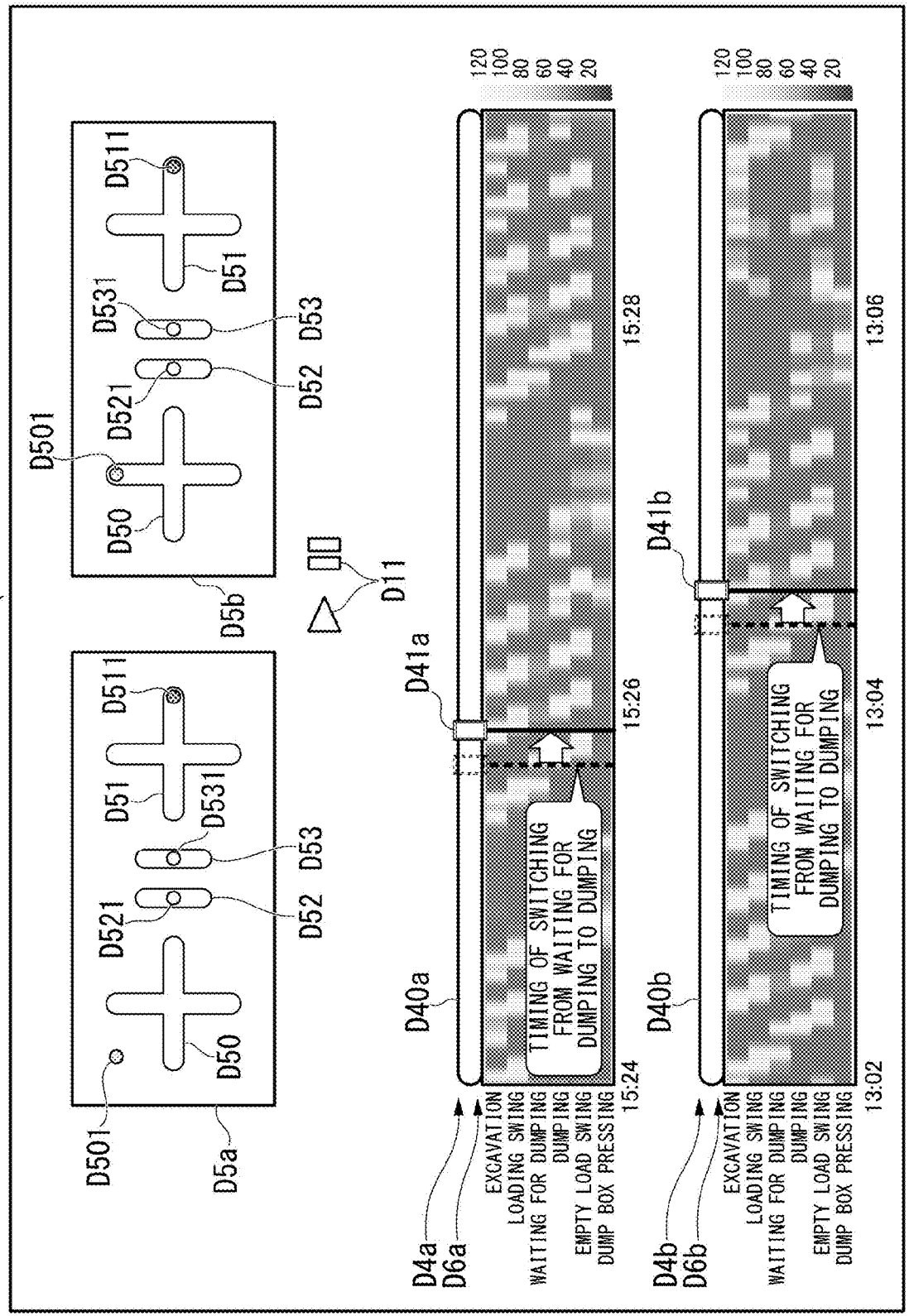
FIG. 13 is a diagram showing an example of a display image according to a modified example of the first embodiment.

FIG. 13 is a diagram showing an example of a display screen of the reproduction apparatus according to a modified example of the first embodiment. For example, the CPU 100 of the reproduction apparatus 10 according to the modified example of the first embodiment causes the display unit 102 to display a display image D as shown in FIG. 13.

The display image D is configured to include operation pattern images D5a and D5b, time scroll bars D4a and D4b, and heat map images D6a and D6b.

The operation pattern images D5a and D5b are areas where animations of input operations on the operation lever and the running lever by the operator of the construction machine 3 are reproduced. The operation pattern image D5a is an image in which the information of the PPC pressure included in the designated log information TL1 is applied to the operation panel model M1 (FIG. 11). Also, the operation pattern image D5b is an image in which the information of the PPC pressure included in the comparison log information TL2 is applied to the operation panel model M1 (FIG. 11).

Each of the operation pattern images D5a and D5b includes operation images D50, D51, D52, and D53 and operation icons D501, D511, D521, and D531.

Specifically, the operation image D50 is an area where an animation of an input operation on the operation lever L1, which is the operation lever on the left side, is reproduced. A position of the operation icon D501 on the operation image D50 indicates a direction of an input to the operation lever L1. Also, a color of the operation icon D501 displayed on the operation image D50 indicates a degree of input to the operation lever L1. For example, when there is no input to the operation lever L1, the icon D501 is displayed in full "white" and is displayed to change from "white" to "red" as the degree of input increases. Also, a combination of colors that changes according to the degree of input is not limited to the above example. The same is true for the icons D511, D521, and D531 to be described below.

The operation image D51 is an area where an animation of an input operation on the operation lever L2, which is the operation lever on the right side, is reproduced. A position of the operation icon D511 on the operation image D51 indicates a direction of an input to the operation lever L2. Also, a color of the operation icon D511 displayed on the operation image D51 indicates a degree of input to the operation lever L2.

The operation image D52 is an area where an animation of an input operation on the running lever R1, which is the running lever on the left side, is reproduced. A position of the operation icon D521 on the operation image D52 indicates a direction of an input to the running lever R1. Also, a color of the operation icon D521 displayed on the operation image D52 indicates a degree of input to the running lever R1.

The operation image D53 is an area where an animation of an input operation on the running lever R2, which is the running lever on the right side, is reproduced. A position of the operation icon D531 on the operation image D53 indicates a direction of an input to the running lever R2. Also, a color of the operation icon D531 displayed on the operation image D53 indicates a degree of input to the running lever R2.

According to the reproduction apparatus 10 according to the modified example of the first embodiment, the input operations on the operation lever and the running lever by the operator of the construction machine 3 are simultaneously reproduced, so that the two input operations can be easily compared.

Other Modified Examples

Although a mode in which the log information TL according to the first embodiment is divided into two parts of designated log information TL1 designated by the operator as a reproduction target and comparison log information TL2 provided in advance as a model has been described, other embodiments are not limited to the above mode. For example, a reproduction apparatus 10 according to another embodiment may be in a mode in which simultaneous animation reproduction is performed using two pieces of log information TL for which the above-described division is absent as the log information TL.

Although a mode in which the log information according to the first embodiment has been described in the mode in which the angle information and the like are recorded in association with an acquisition time point (timestamp) as shown in FIGS. 6 to 8 has been described, other embodiments are not limited to the mode.

For example, the log information according to another embodiment may be in a mode in which angle information and the like are recorded in association with symbols (numeric characters and letters) for identifying the order. Also, in another embodiment, only the angle information is recorded in the log information and the reproduction apparatus 10 may be in a mode in which the angle information is read in order from the top (recorded order).

Although a mode in which the reproduction apparatus 10 according to the first embodiment synchronizes and reproduces a construction machine model image D10*a* to which the angle information included in the designated log information TL1 is applied and a construction machine the model image D10*b* to which the angle information included in the comparison log information TL2 is applied by identifying the reproduction start time points of both the construction machine model image D10*a* and the construction machine model image D10*b* on the basis of the element work heat map H2 has been described, the reproduction apparatus 10 according to another embodiment is not limited to the above mode.

The reproduction apparatus 10 according to the other embodiment may set an initial time point recorded in the designated log information TL1 as a reproduction start time point of the construction machine model image D10*a* and set an initial time point recorded in the comparison log information TL2 as a reproduction start time point of the construction machine model image D10*b*. Also, the reproduction apparatus 10 according to another embodiment may set a time point identical to the reproduction start time point identified for the construction machine model image D10*a* as the reproduction start time point of the construction machine model image D10*b*.

Although a mode in which the reproduction apparatus 10 according to the first embodiment draws the construction machine model image D10*a* to which the angle information included in the designated log information TL1 is applied and the construction machine model image D10*b* to which the angle information included in the comparison log information TL2 is applied in an overlapping way has been described, other embodiments are not limited to the above mode.

For example, in the reproduction apparatus 10 according to another embodiment, the construction machine model image D10*a* and the construction machine model image D10*b* may be displayed side by side and separately.

The content of the log information TL (FIGS. 6 to 8) according to the first embodiment is not limited to the above in the other embodiments. For example, when the construction machine 3 is another vehicle type other than a hydraulic excavator, log information TL corresponding to the vehicle type is recorded. The other vehicle type is, for example, a wheel loader or the like.

Likewise, as the construction machine model TM according to the first embodiment, a process of displaying each of the outer shape and the operation panel of the construction machine 3 is provided for each of the vehicle type and model of the construction machine 3.

Also, a case in which the log information TL according to the first embodiment includes the position of the construction machine 3 at each time point, the angles of various movable parts (FIG. 6), the PPC pressure in the operation mechanism (FIG. 7), and the status of the drive mechanism of the construction machine 3 (FIG. 8) has been described, other embodiments are not limited thereto.

The reproduction apparatus 10 according to another embodiment may acquire only the information according to FIG. 6 as the log information TL. However, in this case, the reproduction apparatus 10 cannot select the comparison log information TL2 on the basis of a driving mode and a size of the transport vehicle.

Although a mode in which the reproduction apparatus 10 according to the first embodiment includes both the outer shape 3D model M0 and the operation panel model M1 as the construction machine model TM and reproduces the outer shape 3D model M0 and the operation panel model M1 has been described, other embodiments is not limited to the above mode. The reproduction apparatus 10 according to another embodiment may reproduce only one of the outer shape 3D model M0 and the operation panel model M1 in the construction machine model TM including either the outer shape 3D model M0 or the operation panel model M1. Also, the reproduction apparatus 10 may be in a mode in which it is possible to change whether or not to reproduce either the outer shape 3D model M0 or the operation panel model M1 according to setting.

Also, the reproduction apparatus 10 according to another embodiment may have not only the reproduction of the normal speed but also fast forward, slow reproduction, repeat, and rewind functions.

For example, when reproduction is performed using 15 pieces of angle information or the like per second in normal reproduction, the reproduction unit 1003 implements a fast-forward function of 2× speed by performing reproduction using 30 pieces of angle information or the like per second or alternately employing every other piece out of 15 pieces of angle information or the like per second. A fast-forward function of 3× speed or the like can be implemented by a similar mechanism.

Likewise, when reproduction is performed using 15 pieces of angle information or the like per second in normal reproduction, the reproduction unit 1003 reproduces 15 pieces of angle information or the like during 2 seconds to implement a slow reproduction function of ½× speed. In particular, by enabling slow reproduction of the operation pattern images D5*a* and D5*b* (FIG. 13), a trainee can ascertain lever operation technology of the expert in more detail.

Likewise, when reproduction has been performed through the sequential application from the oldest timestamp in the normal reproduction, the rewind reproduction is implemented by performing reproduction through the sequential application from the newest timestamp.

Although a mode in which a degree of input to each operation mechanism is expressed by the PPC pressure with respect to the operation mechanisms of the operation levers L1 and L2, the running levers R1 and R2, and the like according to the first embodiment has been described, other embodiments are not limited to the above mode.

For example, the operation mechanism according to another embodiment may be an electrical operation mechanism. In this case, various types of operation mechanisms may include an operation member such as an electric lever and an operation amount sensor such as a potentiometer inclinometer that electrically detects an amount of tilt of the operation member. In the present embodiment, the detection data of the operation amount sensor is recorded in the data logger 20.

Also, although a mode in which the reproduction apparatus 10 according to the first embodiment represents the construction machine 3 using the outer shape 3D model M0 has been described, other embodiments are not limited to the above mode. The reproduction apparatus 10 according to the other embodiment may represent, for example, the construction machine 3 using a 2D model.

Although a mode in which the reproduction apparatus 10 according to the first embodiment represents a degree of input by the operation mechanism of the operator using a change in a color of the icon D501 or the like shown within the operation pattern images D5a and D5b has been described, other embodiments are not limited to the above mode. For example, the reproduction apparatus according to another embodiment may represent a degree of input at a position where the icon D501 or the like is drawn. For example, the reproduction apparatus 10 performs drawing at a position close to the center of the operation image D50 when the degree of input to the operation lever L1 is low and performs drawing at a position away from the center within the operation image D50 as the degree of input to the operation lever L1 increases.

Also, in another embodiment, the degree of input may be indicated according to the strength of the gradation of the color of the drawing within the operation image D50.

Although a mode in which the reproduction apparatus 10 according to the first embodiment is installed in a place away from the construction machine 3 and is connected to the data logger 20 mounted in the construction machine 3 via a wide area communication network has been described, other embodiments are not limited to the above mode.

For example, in the reproduction apparatus 10 according to another embodiment, a part or all of the configuration of the reproduction apparatus 10 may be installed inside the construction machine 3. In this case, the data logger 20 may transmit the log information TL to the reproduction apparatus 10 via the network inside the construction machine 3 or the like without involving the wide area communication network. Thereby, the operator getting on the construction machine 3 can confirm the movement of the construction machine 3 operated by the operator himself by reproducing the animation on the spot. Also, it is possible to use a reproduction result as guidance by reproducing the movement of the construction machine 3 as a model for the operator of the construction machine 3.

Also, the reproduction apparatus 10 installed inside the construction machine 3 may acquire the log information TL of the other construction machine 3 via a wide area communication network or the like. Thereby, an animation of the state of the construction machine 3 other than the construction machine 3 in which the reproduction apparatus 10 is mounted can be reproduced.

Also, a mode in which the reproduction apparatus 10 according to another embodiment is installed in a place away from the construction machine 3 and transmits video information generated through an animation reproduction process to a monitor mounted in the construction machine 3 so that the video information is displayed may be used.

Also, in another embodiment, as a mode of the reproduction instruction received from the operator, for example, a reproduction period may be designated. For example, the reproduction period may include a reproduction start time point and a reproduction end time point. In this case, the reproduction apparatus 10 reproduces the construction machine 3 during the received reproduction period. Also, in other embodiments, it is not essential to designate the reproduction end time. For example, in another embodiment, according to a reproduction instruction from the operator, a mode in which reproduction is performed during a certain time period after only the reproduction start time point is received may be used, a mode in which reproduction is continued as long as there is log information may be used, or reproduction may be stopped when various types of other events occur.

Also, the log information TL to be acquired (FIGS. 6 to 8) does not have to be disposed in time-series order. In this case, it is only necessary for the reproduction unit 1003 to apply information used for reproduction from the log information TL to the construction machine model TM in time-series order.

Although the display unit 102 according to the first embodiment displays the work content estimated by the estimation unit 1004 as the heat map images D6a and D6b, other embodiments are not limited to the above. For example, the work content estimated by the estimation unit 1004 may be displayed only with text information. Specifically, the work content estimated by the estimation unit 1004 may be displayed only with text information such as "excavation loading: excavation" in correspondence with a time point during reproduction.

All or part of the process of various types of processing steps of the reproduction apparatus 10 described above is stored in a computer-readable recording medium in the form of a program and the above-described various types of processing steps are performed by the computer reading and executing the program. Also, the computer-readable recording medium refers to a magnetic disc, a magneto-optical disc, a CD-ROM, a DVD-ROM, a semiconductor memory, or the like. Also, the computer program may be distributed to the computer via a communication circuit and the computer receiving the distributed computer program may execute the program.

The above-described program may be a program for implementing some of the above-described functions. Furthermore, the above-described program may be a program capable of implementing the above-described function in combination with a program already recorded on the computer system, i.e., a so-called differential file (differential program).

While some embodiments of the invention have been described above, these embodiments are merely examples, and are not intended to limit the scope of the invention. These embodiments may be implemented in various other forms, and various omissions, replacements, and modifications may be made without departing from the scope of the invention. These embodiments and the modifications are included in the scope or the spirit of the invention, and are included in the scope of the invention of claims and the equivalents thereof.

INDUSTRIAL APPLICABILITY

According to each aspect of the present invention, it is possible to ascertain a movement difference between two different construction machines.

The invention claimed is:

1. A reproduction apparatus comprising a processor configured to:
   acquire first log information and second log information of a construction machine;

reproduce an operation of the construction machine by sequentially applying angle information of the construction machine included in each of the first log information and the second log information to a construction machine model;

determine (i) a first work content from the first log information and (ii) a second work content from the second log information; and synchronize (i) reproduction of the construction machine model based on a first time series of the first work content and (ii) reproduction of the construction machine model based on a second time series of the second work content, wherein the first time series includes a plurality of first element works, and the second time series includes a plurality of second element works, wherein the processor is further configured to:
determine a first element work among the plurality of first element works that matches a second element work among the plurality of second element works, and synchronize a first reproduction start time of the first element work with a second reproduction start time of the second element work.

2. The reproduction apparatus according to claim 1, wherein the processor is configured to set a timing at which the operation of the construction machine is switched from predetermined work to other predetermined work as a reproduction start time point.

3. The reproduction apparatus according to claim 2, wherein the processor is configured to set a timing at which the operation of the construction machine is switched from waiting for dumping to a dumping operation as the reproduction start time point.

4. The reproduction apparatus according to claim 1, wherein the processor is configured to acquire the second log information including information having a predetermined relationship with information included in the first log information.

5. The reproduction apparatus according to claim 4, wherein the processor is configured to acquire the second log information for which a difference between an amount of change in a swing angle indicated in the first log information and an amount of change in a swing angle indicated in the second log information is within a predetermined range.

6. The reproduction apparatus according to claim 4, wherein the processor is configured to acquire the second log information for which a difference between a bucket height in waiting for dumping indicated in the first log information and a bucket height in waiting for dumping indicated in the second log information is within a predetermined range.

7. The reproduction apparatus according to claim 4, wherein the processor is configured to acquire the second log information so that a difference between a vehicle size class of the construction machine indicated in the first log information and a vehicle size class of the construction machine indicated in the second log information is within a predetermined range.

8. The reproduction apparatus according to claim 4 wherein the processor is configured to acquire the second log information so that a driving mode included in the first log information is identical to a driving mode included in the second log information.

9. The reproduction apparatus according to claim 4, wherein the processor is configured to acquire relatively long log information TL2 so that a difference between a size of a transport vehicle serving as a loading target indicated in the first log information and a size of a transport vehicle serving as a loading target indicated in the second log information is within a predetermined range.

10. The reproduction apparatus of claim 1, further comprising:
a display configured to display the first work content and the second work content in an overlapping way or side by side.

11. The reproduction apparatus of claim 1, wherein each of the first work content and the second work content comprises at least one of excavation, backfilling, sloping, loading, plowing, collecting, running, or stopping/storage.

12. The reproduction apparatus of claim 1, wherein the processor is configured to:
generate a first unit work heat map representing the first time series of the first work content and a second unit work heat map representing the second time series, and determine (i) a first timing of switching operations of the construction machine based on the first unit work heat map and (ii) a second timing of switching operations of the construction machine based on the second unit work heat map.

13. The reproduction apparatus of claim 1, wherein the processor is configured to:
obtain (i) a first time series of likelihoods associated with the plurality of first element works and (ii) a second time series of likelihoods associated with the plurality of second element works; and determine the matching of the first element work and the second element work based on the first time series of likelihoods and the second time series of likelihoods.

14. The reproduction apparatus of claim 1, wherein the first reproduction start time and the second reproduction start time are different time points from each other with respect to start times of the first time series and the second time series, respectively.

15. A reproduction method comprising:
acquiring a first log information and a second log information of a construction machine;

reproducing an operation of the construction machine by sequentially applying angle information of the construction machine included in each of the first log information and the second log information to a construction machine model;

determining (i) a first work content from the first log information and (ii) a second work content from the second log information; and synchronizing (i) reproduction of the construction machine model based on a first time series of the first work content and (ii) reproduction of the construction machine model based on a second time series of the second work content, wherein the first time series includes a plurality of first element works, and the second time series includes a plurality of second element works, and wherein the reproduction method further comprises:
determining a first element work among the plurality of first element works that matches a second element work among the plurality of second element works, and synchronizing a first reproduction start time of the first element work with a second reproduction start time of the second element work.

\* \* \* \* \*